United States Patent
Mizuochi

(10) Patent No.: US 7,688,259 B2
(45) Date of Patent: Mar. 30, 2010

(54) POSITIONING DEVICE, METHOD OF CONTROLLING POSITIONING DEVICE, AND RECORDING MEDIUM

(75) Inventor: Shunichi Mizuochi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 274 days.

(21) Appl. No.: 11/806,005

(22) Filed: May 29, 2007

(65) Prior Publication Data

US 2008/0068257 A1    Mar. 20, 2008

(30) Foreign Application Priority Data

May 29, 2006  (JP) .............................. 2006-148834
Jul. 20, 2006  (JP) .............................. 2006-198759

(51) Int. Cl.
G01S 1/00  (2006.01)

(52) U.S. Cl. .................................. 342/357.02; 708/445

(58) Field of Classification Search ............ 342/357.02, 342/357.12; 708/445
See application file for complete search history.

(56) References Cited

U.S. PATENT DOCUMENTS 6,295,022 B1 * 9/2001 Dutka .................. 342/357.06
7,296,046 B2   11/2007 Ono 2004/0267840 A1 * 12/2004 Ono ........................... 708/200

FOREIGN PATENT DOCUMENTS

| EP | 1 491 909 A2 | 12/2004 |
|---|---|---|
| JP | 04-134212 A | 5/1992 |
| JP | 07-333314 A | 12/1995 |
| JP | H08-68651 A | 3/1996 |
| JP | 2000-310538 A | 11/2000 |
| JP | 2001-337156 A | 12/2001 |
| JP | 2004-233071 A | 8/2004 |
| JP | 2005-017198 A | 1/2005 |
| JP | 2005-164590 A | 6/2005 |

* cited by examiner

*Primary Examiner*—Thomas H Tarcza
*Assistant Examiner*—Fred H Mull
(74) *Attorney, Agent, or Firm*—Global IP Counselors, LLP

(57) ABSTRACT

A positioning device, which locates a position based on satellite signals which are signals from positioning satellites, includes a position holding section which holds a reference position P, a stationary condition determination section which determines whether or not the reference position P satisfies stationary conditions B, an average position calculation section which averages the reference position P satisfying the stationary conditions B and a present located position Pg calculated by positioning to calculate an average position Pav, a position output section which outputs the average position Pav, and a position storage section which stores the average position Pav in the position holding section as the reference position P.

9 Claims, 23 Drawing Sheets

FIG. 1
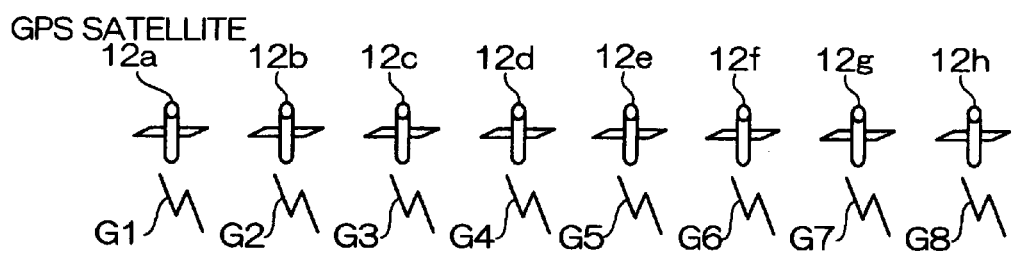
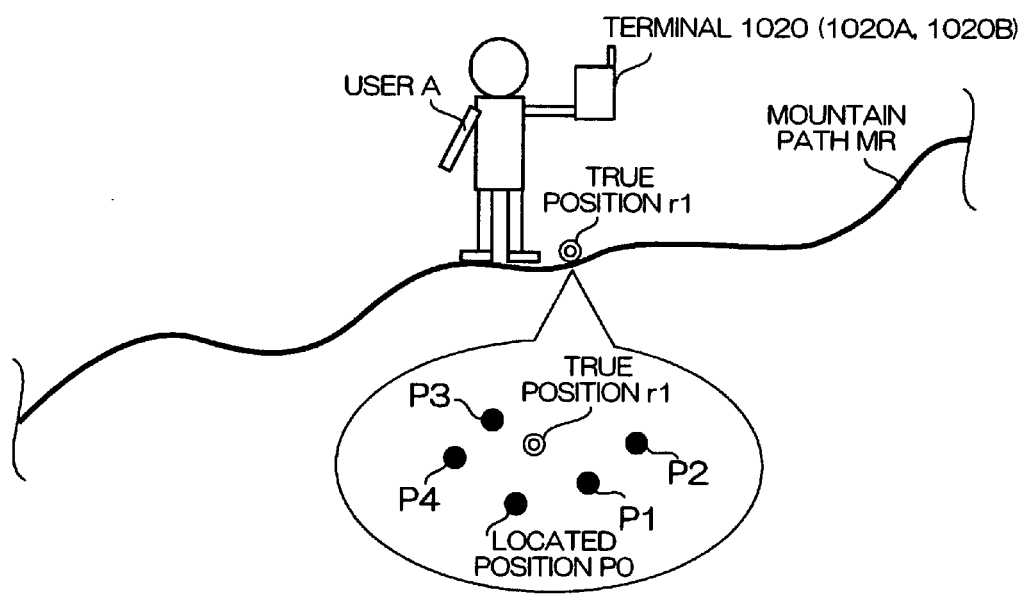

FIG. 5A

SINGLE-SHOT POSITIONING :
POSITIONING IS TERMINATED WHEN VARIATION IN LOCATED
POSITION Pg HAS FALLEN WITHIN PREDETERMINED CONVERGENCE
RANGE OR STABLE POSITION Pst HAS BEEN CALCULATED

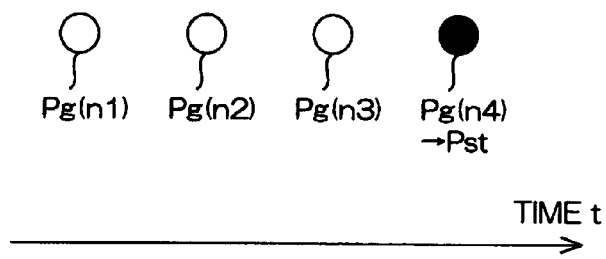

FIG. 5B

MULTI-SHOT POSITIONING :
POSITIONING IS TERMINATED WHEN VARIATION IN LOCATED
POSITION Pg HAS FALLEN WITHIN PREDETERMINED CONVERGENCE
RANGE OR STABLE POSITION Pst HAS BEEN CALCULATED,
AND POSITIONING HAS BEEN PERFORMED FOR PREDETERMINED
PERIOD OF TIME OR PREDETERMINED NUMBER OF TIMES

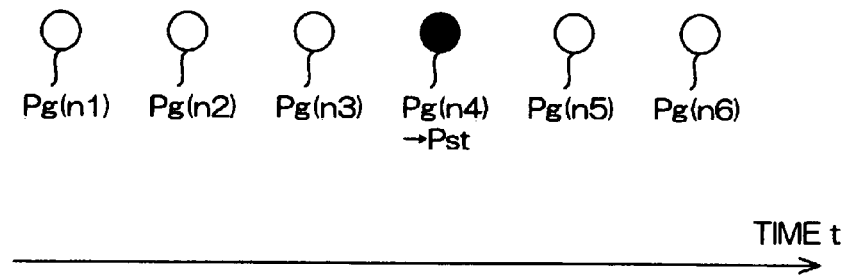

P(n-1) : a1 ≦ γs?

P(n-2) : a1+a2 ≦ γs?

P(n-3) : a1+a2+a3 ≦ γs?

γs = CUMULATIVE DISTANCE
   THRESHOLD VALUE (20 m)

FIG. 7

CONDITION 1: PRESENT VELOCITY v(n) AND VELOCITIES v(n−1) AND THE LIKE IN BUFFER Buff ARE EQUAL TO OR LESS THAN VELOCITY THRESHOLD VALUE $\beta$ CONDITION 2: ELAPSED TIME IS EQUAL TO OR LESS THAN TIME THRESHOLD VALUE $\alpha$ CONDITION 3: DISTANCE BETWEEN PRESENT LOCATED POSITION Pg(n) AND EACH OF POSITIONS P(n−1) AND THE LIKE IS EQUAL TO OR LESS THAN DISTANCE THRESHOLD VALUE $\gamma$ CONDITION 4: CUMULATIVE DISTANCE IS EQUAL TO OR LESS THAN CUMULATIVE DISTANCE THRESHOLD VALUE $\gamma s$

ALL OF CONDITIONS 1, 2, 3, AND 4 ARE SATISFIED=STATIONARY CONDITIONS B

DETERMINES WHETHER OR NOT POSITION SATISFIES STATIONARY CONDITIONS IN ORDER FROM POSITION P(n−1), P(n−2), ... AND TERMINATES DETERMINATION OF STATIONARY CONDITIONS WHEN DETERMINING THAT POSITION DOES NOT SATISFY STATIONARY CONDITIONS

FIG. 8

$$Pav=\{Pg(n)+P(n-1)+P(n-2)+P(n-3)+P(n-4)+P(n-5)\}/6$$

FIG. 9

Buff

| P(n−9) | P(n−8) | P(n−7) | P(n−6) | P(n−5) | P(n−4) | P(n−3) | P(n−2) | P(n−1) | P(n) |
|---|---|---|---|---|---|---|---|---|---|
| t(n−9) | t(n−8) | t(n−7) | t(n−6) | t(n−5) | t(n−4) | t(n−3) | t(n−2) | t(n−1) | t(n) |
| v(n−9) | v(n−8) | v(n−7) | v(n−6) | v(n−5) | v(n−4) | v(n−3) | v(n−2) | v(n−1) | v(n) |

P(n)=Pav or Pg(n)

FIG. 11

|  | INTENSE ELECTRIC FIELD | INTERMEDIATE ELECTRIC FIELD | WEAK ELECTRIC FIELD |
|---|---|---|---|
| VELOCITY THRESHOLD VALUE $\beta$ (m/s) | 0.5 | 0.75 | 2 |
| DISTANCE THRESHOLD VALUE $\gamma$ (m) | 15 | 30 | 100 |

TIME THRESHOLD VALUE $\alpha$ AND
CUMULATIVE DISTANCE THRESHOLD VALUE $\gamma$s
ARE FIXED VALUES FIG. 12
○ : LOCATED POSITION Pg
● : AVERAGE POSITION Pav
(1) Buff
(2) Buff
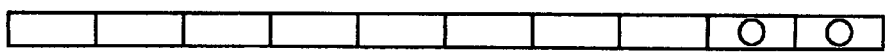
(3) Buff
(4) Buff
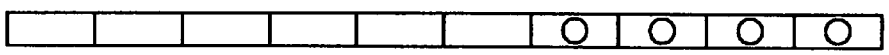
(5) Buff
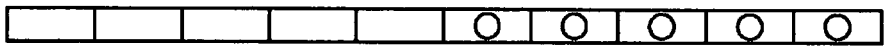
(6) Buff
(7) Buff
(8) Buff
(9) Buff
(10) Buff

STABLE POSITION
(INITIAL AVERAGE POSITION Pav)

* STORES INITIAL STABLE POSITION OBTAINED IN
  SINGLE-SHOT POSITIONING IN BUFFER Buff
* STABLE POSITION : INITIAL AVERAGE POSITION FINAL OUTPUT POSITION
(AVERAGE POSITION Pav OR
LOCATED POSITION Pg(n))

FIG. 16

| | INTENSE ELECTRIC FIELD | INTERMEDIATE ELECTRIC FIELD | WEAK ELECTRIC FIELD |
|---|---|---|---|
| VELOCITY THRESHOLD VALUE $\beta$ (m/s) | 0.5 | 0.75 | 2 |
| DISTANCE THRESHOLD VALUE $\gamma$ (m) | 15 | 30 | 100 |

TIME THRESHOLD VALUE $\alpha$ AND
CUMULATIVE DISTANCE THRESHOLD VALUE $\gamma$s
ARE FIXED VALUES

AFTER CALCULATING STABLE POSITION

↓

| | INTENSE ELECTRIC FIELD | INTERMEDIATE ELECTRIC FIELD | WEAK ELECTRIC FIELD |
|---|---|---|---|
| VELOCITY THRESHOLD VALUE $\beta$ (m/s) | 0.3 | 0.6 | 1.2 |
| DISTANCE THRESHOLD VALUE $\gamma$ (m) | 10 | 20 | 70 |

TIME THRESHOLD VALUE $\alpha$ AND
CUMULATIVE DISTANCE THRESHOLD VALUE $\gamma$s
ARE FIXED VALUES FIG. 18
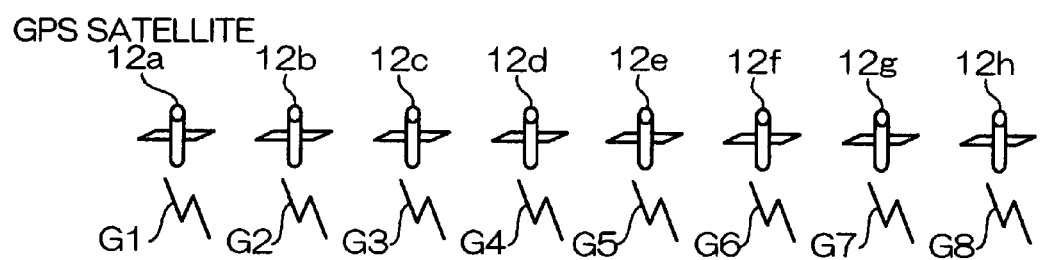
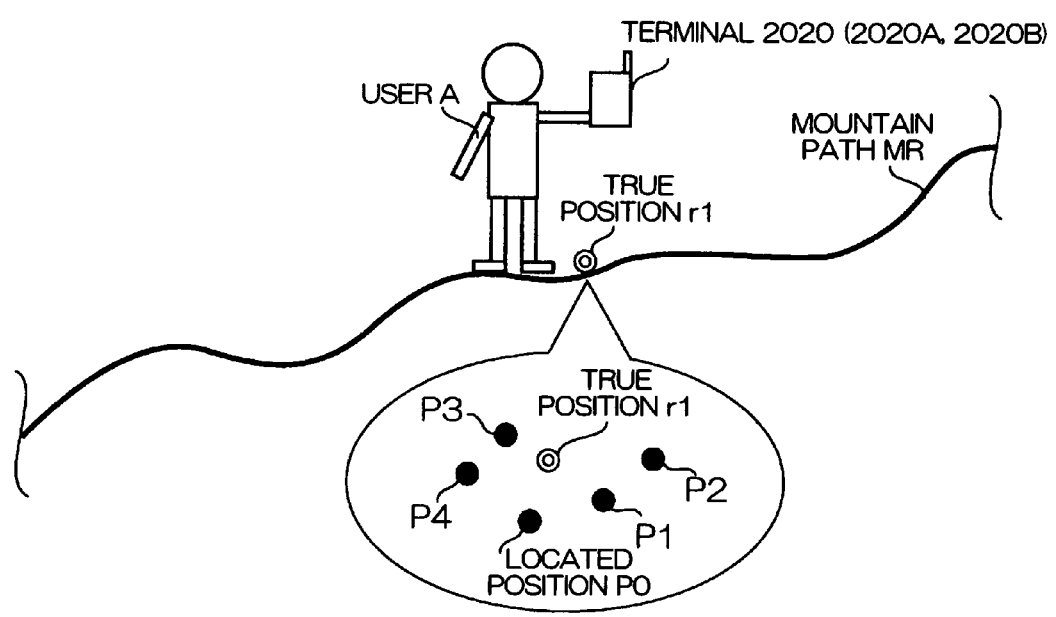

FIG. 22A

SINGLE-SHOT POSITIONING :
POSITIONING IS TERMINATED WHEN VARIATION IN LOCATED
POSITION Pg HAS FALLEN WITHIN PREDETERMINED CONVERGENCE
RANGE OR STABLE POSITION Pst HAS BEEN CALCULATED

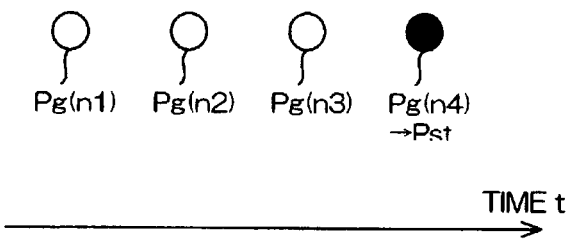

TIME t

FIG. 22B

MULTI-SHOT POSITIONING :
POSITIONING IS TERMINATED WHEN VARIATION IN LOCATED
POSITION Pg HAS FALLEN WITHIN PREDETERMINED CONVERGENCE
RANGE OR STABLE POSITION Pst HAS BEEN CALCULATED,
AND POSITIONING HAS BEEN PERFORMED FOR PREDETERMINED
PERIOD OF TIME OR PREDETERMINED NUMBER OF TIMES

FIG. 23

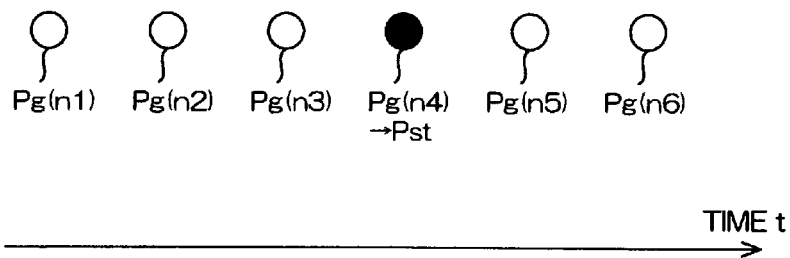

P(n-1) : $a1 \leqq \gamma s$?

P(n-2) : $a1+a2 \leqq \gamma s$?

P(n-3) : $a1+a2+a3 \leqq \gamma s$?

$\gamma s$ = CUMULATIVE DISTANCE THRESHOLD VALUE (20 m)

$$Pa = \{Pg(n) + P(n-1) + P(n-2) + P(n-3) + P(n-4) + P(n-5)\}/6$$

$$Pb = \{Pg(n) + P(n-1)\}/2$$

P(n)=Pa or Pb or Pg(n)

POSITIONING DEVICE, METHOD OF CONTROLLING POSITIONING DEVICE, AND RECORDING MEDIUM

Japanese Patent Application No. 2006-148834 filed on May 29, 2006 and Japanese Patent Application No. 2006-198759 filed on Jul. 20, 2006, are hereby incorporated by reference in their entirety.

BACKGROUND OF THE INVENTION

The present invention relates to a positioning device which utilizes signals from positioning satellites, a method of controlling a positioning device, and a recording medium.

A positioning system has been used which locates the present position of a GPS receiver utilizing a global positioning system (GPS) (satellite navigation system) which is an example of a satellite positioning system (SPS).

The GPS receiver receives signals from three or more GPS satellites, and calculates the distance between each GPS satellite and the GPS receiver (hereinafter called "pseudo-range") from the difference between the time at which the signal is transmitted from each GPS satellite and the time at which the signal reaches the GPS receiver (hereinafter called "delay time"), for example. The GPS receiver calculates (locates) the present position using the pseudo-range and satellite orbital information of each GPS satellite contained in the signal received from each GPS satellite.

However, when the signal from the GPS satellite reaches the GPS receiver after being reflected by a building or the like, or the signal strength is weak, or the dilution of precision (DOP) of the GPS satellite in the sky is low, the located position may differ from the true position to a large extent, whereby the accuracy of the located position may deteriorate.

A technology has been proposed which calculates the present expected position (hereinafter called "expected position") from the velocity vector and the elapsed time based on the preceding located position, and averages the expected position and the present located position (e.g. JP-A-8-68651 (e.g. FIG. 5)).

However, the GPS satellite moves in the satellite orbit even when the GPS receiver is stationary, and the reception state of the satellite signal changes from moment to moment. Therefore, the velocity indicated by the velocity vector does not necessarily become zero.

According to the above technology, when the elapsed time is 10 seconds (s), the expected position differs from the preceding position at a distance corresponding to 10 seconds even when the GPS receiver is stationary. As a result, the accuracy of the position obtained by averaging deteriorates, whereby the output position may differ from the true position.

According to the above technology, when the GPS receiver is stationary, the expected position cumulatively differs from the preceding position with the passage of time from the preceding positioning, whereby the output position differs from the true position.

Moreover, when the preceding located position differs from the true position and lacks reliability, the reliability of the expected position and the average position also deteriorate.

When a GPS receiver carried by a pedestrian moves at a low speed, the present located position may differ from the preceding located position to a large extent depending on the velocity indicated by the velocity vector, although the actual present position is near the preceding located position.

SUMMARY

According to one aspect of the invention, there is provided a positioning device which locates a position based on satellite signals which are signals from positioning satellites, the positioning device comprising:

a position holding section which holds a reference position;

a stationary condition determination section which determines whether or not the reference position satisfies stationary conditions;

an average position calculation section which averages the reference position satisfying the stationary conditions and a present located position calculated by positioning to calculate an average position;

a position output section which outputs the average position; and a position storage section which stores the average position in the position holding section as the reference position.

According to another aspect of the invention, there is provided a positioning device which locates a position based on satellite signals which are signals from positioning satellites, the positioning device comprising:

a position holding section which holds a reference position;

a movement state determination section which determines movement state of the positioning device;

an average position calculation section which averages the reference position and a present located position calculated by positioning to calculate an average position based on the movement state;

a position output section which outputs the average position; and a position storage section which stores the average position in the position holding section as the reference position.

BRIEF DESCRIPTION OF THE SEVERAL VIEWS OF THE DRAWING

FIG. 1 is a schematic view showing a terminal and the like according to a first embodiment.

FIGS. 5A and 5B are views showing the type of process performed based on a positioning program according to the first embodiment.

FIG. 7 is a view illustrative of a process based on a stationary state determination program according to the first embodiment.

FIG. 8 is a view showing an example of a process based on an average position calculation program according to the first embodiment.

FIG. 9 is a view showing an example of the buffer Buff according to the first embodiment.

FIG. 11 is a view showing an example of a velocity threshold value and the like according to a first modification of the first embodiment.

FIG. 12 is a view illustrative of a process based on a position storage program according to the first modification of the first embodiment.

FIG. 16 is a view showing an example of a velocity threshold value and the like according to the second modification of the first embodiment.

FIG. 18 is a schematic view showing a terminal and the like according to a second embodiment.

FIGS. 22A and 22B are views showing the type of process performed based on a positioning program according to the second embodiment.

FIG. 23 is a view illustrative of a process based on an elapsed time evaluation program according to the second embodiment.

DETAILED DESCRIPTION OF THE EMBODIMENT

Figure 2:
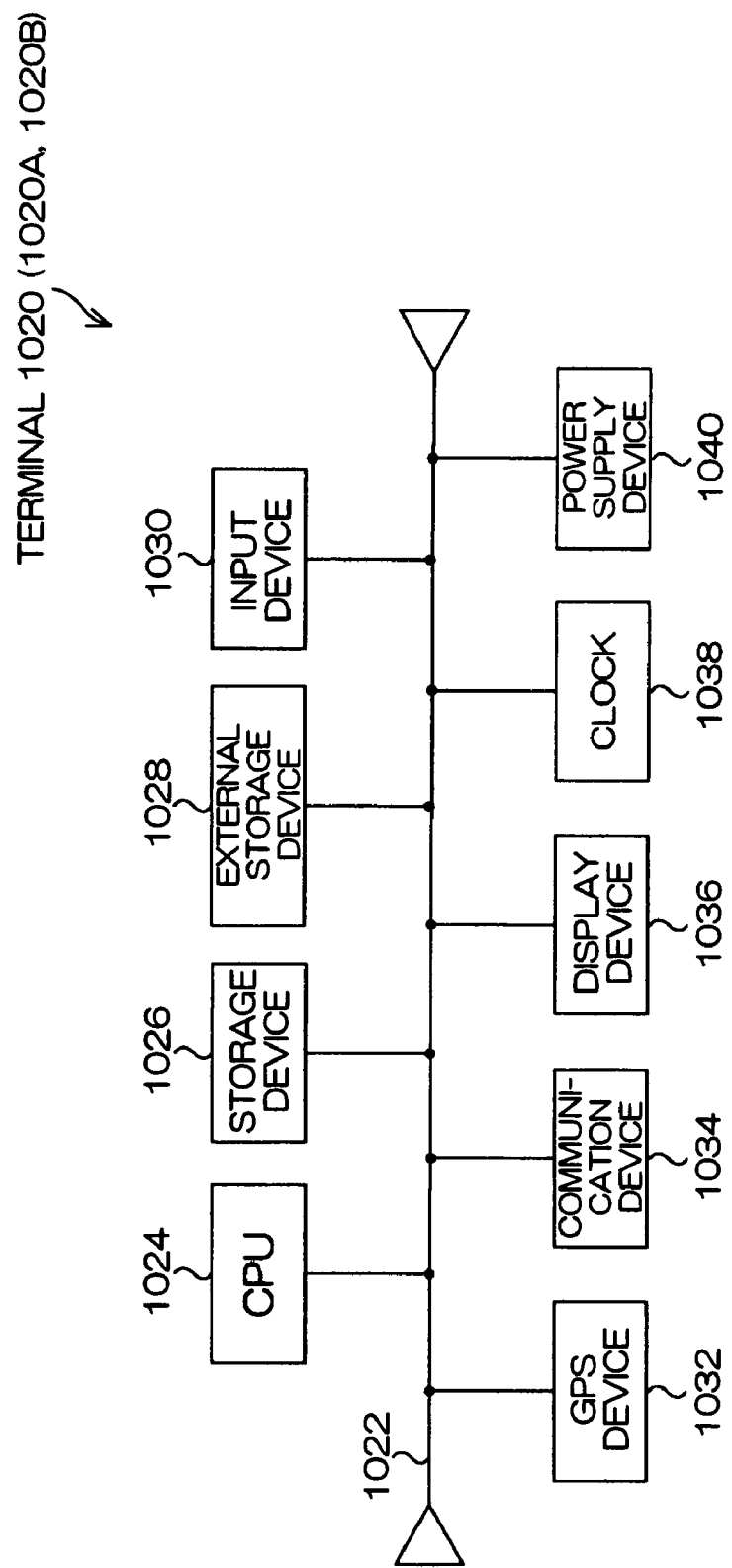
FIG. 2 is a schematic view showing the main hardware configuration of the terminal according to the first embodiment.

The invention may allow a reliable and accurate position to be output during stationary state or a low-speed movement state.

According to one embodiment of the invention, there is provided a positioning device which locates a position based on satellite signals which are signals from positioning satellites, the positioning device comprising:

a position holding section which holds a reference position;

a stationary condition determination section which determines whether or not the reference position satisfies stationary conditions;

an average position calculation section which averages the reference position satisfying the stationary conditions and a present located position calculated by positioning to calculate an average position;

a position output section which outputs the average position; and a position storage section which stores the average position in the position holding section as the reference position.

According to this embodiment, since the positioning device includes the average position calculation section, the positioning device can average the reference position satisfying the stationary conditions and the present located position calculated by positioning to calculate the average position. Specifically, the positioning device does not average (correct) the expected position estimated from the preceding located position, the preceding velocity vector, and the elapsed time and the present located position. The positioning device averages the reference position satisfying the stationary conditions and the present located position calculated by positioning to calculate the average position. Therefore, the accuracy of the preceding velocity vector does not affect the correction of the present located position.

When the positioning device remains stationary, the located position is continuously indicated by the coordinates near the true position. The reference position is located closer to the true position since the variation in the located positions has been reduced by averaging. On the other hand, the true position does not necessarily exist near the expected position.

Specifically, the reference position satisfying the stationary conditions is highly reliable. Moreover, a plurality of reference positions satisfying the stationary conditions may exist.

Therefore, the output position becomes very close to the true position in comparison with the case of outputting the position obtained by averaging the expected position and the present located position by averaging the reference position and the present located position and outputting the average position.

This allows a reliable and accurate position to be output.

A state satisfying the stationary conditions is called a stationary state. The stationary state is a state in which the positioning device remains stationary and is determined based on the present located position of the positioning device.

In the positioning device according to this embodiment, the position holding section can store a plurality of the reference positions; and the stationary conditions may include:

a condition whereby an elapsed time between a time when calculating each of a specific number of the reference positions and a present time is within an allowable time range;

a condition whereby a moving velocity of the positioning device when calculating each of a specific number of the reference positions and a present moving velocity of the positioning device are within a predetermined allowable velocity range; and a condition whereby a distance between each of a specific number of the reference positions and the present located position is within an allowable distance range.

According to this configuration, since the stationary state of the positioning device is determined based on the stationary conditions using a plurality of criteria (i.e. elapsed time, moving velocity, and distance), whether or not the positioning device is in a stationary state can be accurately determined.

In the positioning device according to this embodiment, the position holding section can store a plurality of the reference positions; and the stationary conditions may include a condition whereby a cumulative distance which is a path length between a specific number of the reference positions and the present located position is equal to or less than a predetermined cumulative distance threshold value.

According to this configuration, the stationary state of the positioning device can be determined using the cumulative distance as one of the stationary conditions. Therefore, even if the positioning device moves circularly within a short range and the stationary state of the positioning device cannot be determined using the distance, the stationary state can be determined based on the cumulative distance.

In the positioning device according to this embodiment, the stationary conditions may be specified corresponding to reception environment of the satellite signals.

According to this configuration, the positioning device can appropriately determine the stationary state corresponding to the reception environment.

In the positioning device according to this embodiment, the position storage section may store the located position in the position holding section instead of the reference position until a predetermined number is reached, and may store the reference position after the predetermined number has been reached.

According to this configuration, even if the position initially stored in the position holding section differs from the true position to a large extent, the positioning device can promptly reduce its effects.

In the positioning device according to this embodiment, the position storage section may store the average position initially calculated within a positioning time involving a plurality of positioning operations in the position holding section, and may update the initially calculated average position held in the position holding section with the average position last calculated within the positioning time.

According to this configuration, since the position storage section stores the initially calculated average position in the position holding section, the positioning device can promptly store the new position in the position holding section without waiting for expiration of the positioning time. This allows the subsequent average position to promptly reflect the new position.

In general, when continuously locating the position, the located position calculated later becomes stable and accurate. If the accuracy of the located position is high, the accuracy of the average position is increased.

Since the position storage section updates the initially calculated average position with the last calculated average position, an accurate position can be stored in the position storage section when the positioning time expires.

The positioning device according to this embodiment may comprise:

a stationary condition change section which makes the stationary conditions more severe after the initial average position has been calculated.

If the average position is calculated and held in the position storage section, the position in the position storage section used to determine the stationary conditions reflects the latest position.

Therefore, the positioning device can more accurately determine the stationary state by causing the latest position to be reflected and making the stationary conditions more severe.

In the positioning device according to this embodiment, the average position calculation section may average the positions using the reference position satisfying the stationary conditions as long as a state in which the reference position does not satisfy the stationary conditions does not continuously occur.

According to this configuration, even if one reference position has a large error and the positioning device has erroneously determined that the stationary conditions are not satisfied, since the reference position calculated before the above reference position can be used for averaging, the accuracy of the average position can be improved.

According to another embodiment of the invention, there is provide a positioning device which locates a position based on satellite signals which are signals from positioning satellites, the positioning device comprising:

a position holding section which holds a reference position;

a movement state determination section which determines movement state of the positioning device;

an average position calculation section which averages the reference position and a present located position calculated by positioning to calculate an average position based on the movement state;

a position output section which outputs the average position; and a position storage section which stores the average position in the position holding section as the reference position.

According to this embodiment, since the positioning device includes the average position calculation section, the positioning device can calculate the average position based on the movement state. Specifically, the positioning device does not average (correct) the expected position estimated from the preceding located position, the preceding velocity vector, and the elapsed time and the present located position. The positioning device averages the reference position and the present located position calculated by positioning to calculate the average position based on the movement state. Therefore, the accuracy of the preceding velocity vector does not affect the correction of the present located position.

When the positioning device remains stationary, the located position is continuously indicated by the coordinates near a specific position. When the positioning device moves at a low speed, the located position is indicated by the coordinates which gradually move away from the specific position.

Since the variation in the located positions has been reduced by averaging, the reference position is indicated by the coordinates near the true position when the positioning device remains stationary or moves at a low speed. On the other hand, the true position does not necessarily exist near the expected position.

Therefore, the output position becomes very close to the true position in comparison with the case of outputting the position obtained by averaging the expected position and the present located position by averaging the reference position and the present located position and outputting the average position.

This allows a reliable and accurate position to be output.

In the positioning device according to this embodiment, the movement state determination section may determine whether or not the movement state of the positioning device satisfies stationary conditions whereby whether or not the positioning device remains stationary can be determined, and may determine whether or not the movement state of the positioning device satisfies low-speed movement conditions whereby whether or not the positioning device moves at a low speed can be determined; and when the movement state determination section has determined that the positioning device remains stationary, the average position calculation section may average the reference position satisfying the stationary conditions and the present located position, and, when the movement state determination section has determined that the positioning device moves at a low speed, the average position calculation section may average the latest reference position and the present located position.

According to this configuration, the positioning device can average the reference position satisfying the stationary conditions and the present located position when the positioning device remains stationary. Since a plurality of reference positions satisfying the stationary conditions may exist, the reliability of the average position is further increased.

The positioning device can average the latest reference position and the present located position when the positioning device moves at a low speed. Therefore, when the positioning device moves at a low speed, the positioning device can calculate the average position corresponding to the low-speed movement state while eliminating the effects of the old reference position by averaging the latest reference position and the present located position.

In the positioning device according to this embodiment, the movement state determination section may determine whether or not the stationary conditions are satisfied, and may determine whether or not the low-speed movement conditions are satisfied when the movement state does not satisfy the stationary conditions.

According to this configuration, since the positioning device does not determine the low-speed movement conditions when the stationary conditions are satisfied, the positioning device can promptly calculate the average position when the positioning device is in a stationary state.

In the positioning device according to this embodiment, the average position calculation section may calculate the average position when a variation in located positions sequentially calculated by positioning has fallen within a predetermined range.

According to this configuration, since the positioning device calculates the average position when the variation in the located positions has fallen within the predetermined range, the positioning device can calculate the average position after the located position has become stable to ensure reliability.

In the positioning device according to this embodiment, the movement state determination section may determine whether or not the movement state of the positioning device satisfies stationary conditions whereby to be able to determine that the positioning device remains stationary; and when the movement state determination section has determined that the positioning device remains stationary, the average position calculation section may calculate the average position without waiting for the variation in the located positions to fall within the predetermined range.

According to this configuration, since the positioning device calculates the average position without waiting for the variation in the located positions to fall within the predetermined range, the positioning device can promptly calculate the average position.

According to a further embodiment of the invention, there is provided a method of controlling a positioning device which locates a position based on satellite signals which are signals from positioning satellites and includes a position holding section which holds a reference position, the method comprising:

a stationary condition determination step of determining whether or not the reference position satisfies stationary conditions;

an average position calculation step of averaging the reference position satisfying the stationary conditions and a present located position calculated by positioning to calculate an average position;

a position output step of outputting the average position; and a position storage step of storing the average position in the position holding section as the reference position.

According to a further embodiment of the invention, there is provided a method of controlling a positioning device which locates a position based on satellite signals which are signals from positioning satellites and includes a position holding section which holds a reference position, the method comprising:

a movement state determination step of determining a movement state of the positioning device;

an average position calculation step of averaging the reference position and a present located position calculated by positioning to calculate an average position based on the movement state;

a position output step of outputting the average position; and a position storage step of storing the average position in the position holding section as the reference position.

According to a further embodiment of the invention, there is provided a computer-readable recording medium recorded thereon a program for causing a computer included in a positioning device, which locates a position based on satellite signals which are signals from positioning satellites and includes position holding means which holds a reference position, to execute:

a stationary condition determination step of determining whether or not the reference position satisfies stationary conditions;

an average position calculation step of averaging the reference position satisfying the stationary conditions and a present located position calculated by positioning to calculate an average position;

a position output step of outputting the average position; and a position storage step of storing the average position in the position holding section as the reference position.

According to a further embodiment of the invention, there is provided a computer-readable recording medium recorded thereon a program for causing a computer included in a positioning device, which locates a position based on satellite signals which are signals from positioning satellites and includes position holding means holds a reference position, to execute:

a movement state determination step of determining a movement state of the positioning device;

an average position calculation step of averaging the reference position and a present located position calculated by positioning to calculate an average position based on the movement state;

a position output step of outputting the average position; and a position storage step of storing the average position in the position holding section as the reference position.

Preferred embodiments of the invention are described below in detail with reference to the drawings.

The following embodiments illustrate specific preferred examples of the invention and are provided with various technologically preferred limitations. Note that the scope of the invention is not limited to the following embodiments unless there is a description limiting the invention.

First Embodiment

FIG. 1 is a schematic view showing a terminal 1020 and the like according to a first embodiment of the invention.

As shown in FIG. 1, the terminal 1020 is held by a user A. The terminal 1020 can receive signals G1, G2, G3, G4, G5, G6, G7, and G8 from GPS satellites 12*a*, 12*b*, 12*c*, 12*d*, 12*e*, 12*f*, 12*g*, and 12*h* (positioning satellites), for example. The signals G1 and the like exemplify satellite signals. The terminal 1020 exemplifies a positioning device.

The user A remains stationary on a mountain path MR. For example, the user A has met with an accident and awaits rescue. The terminal 1020 also remains stationary. The true position of the terminal 1020 is a position r1. The terminal 1020 can allow the user A to be reliably rescued by outputting a position close to the true position r1 as much as possible in a state in which the terminal 1020 actually remains stationary.

However, the GPS satellite 12*a* and the like move in the satellite orbits, and the reception state of the signals G1 and the like changes from moment to moment. Therefore, the located position also changes from moment to moment. For example, the located position changes in the order of P0, P1, P2, P3, and P4 with the passage of time.

The terminal 1020 can output a reliable and accurate position in a stationary state as described below, even if the located position P0 and the like change.

The terminal 1020 may be a portable car navigation system which can calculate (locate) the position and display the acquired position information together with map information, for example.

The terminal 1020 may be a portable telephone, for example. The terminal 1020 may be a car navigation system, a personal handy-phone system (PHS), a personal digital assistance (PDA), or the like. Note that the terminal 1020 is not limited thereto.

The number of GPS satellites 12*a* and the like is not limited to eight. For example, the number of GPS satellites may be three or more and seven or less, or nine or more.

(Main Hardware Configuration of Terminal 1020)

FIG. 2 is a schematic view showing the main hardware configuration of the terminal 1020.

As shown in FIG. 2, the terminal 1020 includes a computer which includes a bus 22.

A central processing unit (CPU) 1024, a storage device 1026, an external storage device 1028, and the like are connected with the bus 1022. The storage device 1026 is a random access memory (RAM), a read only memory (ROM), or the like. The external storage device 1028 is a hard disk drive (HDD) or the like.

An input device 1030 for inputting various types of information and the like, a GPS device 1032 for receiving the signals G1 and the like from the GPS satellites 12*a* and the like, a communication device 1034, a display device 1036 for displaying various types of information, a clock 1038, and a power supply device 1040 are also connected with the bus 1022.

(Main Software Configuration of Terminal 1020)

Figures 3, 4:
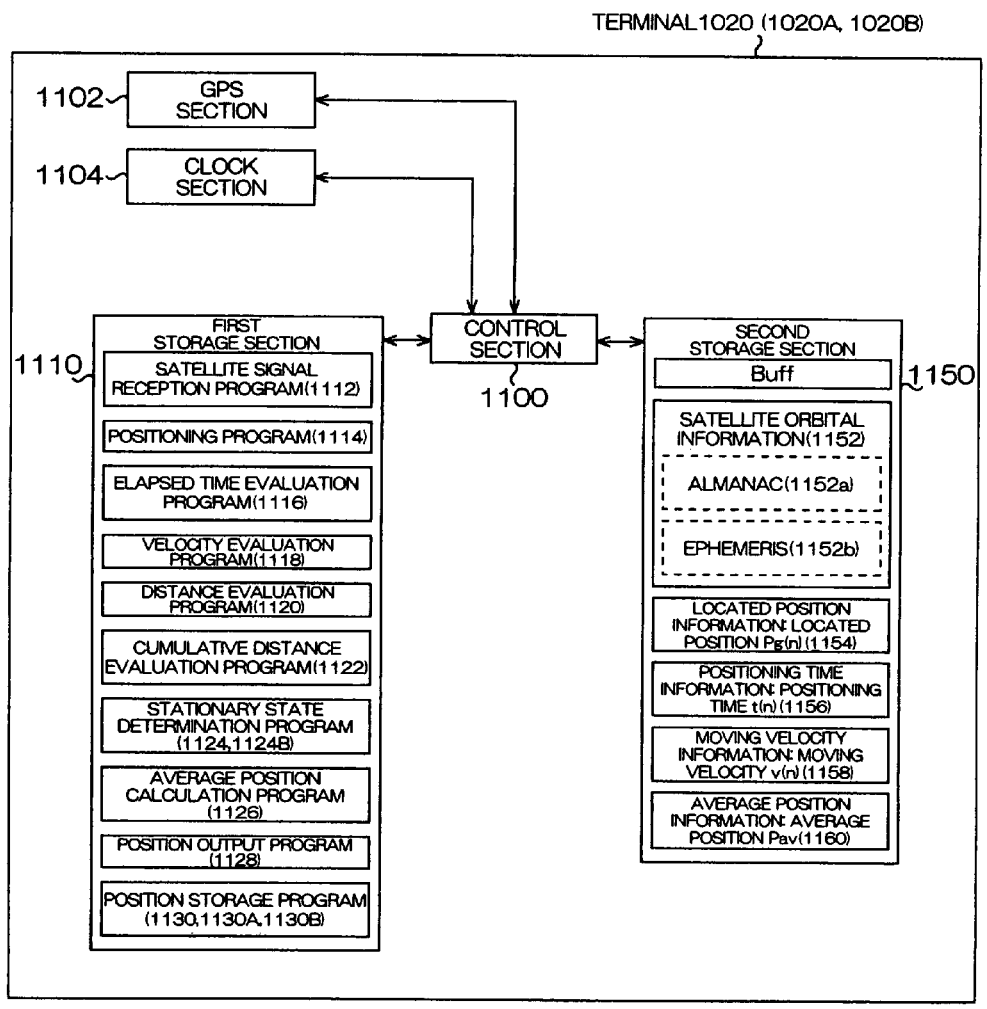
FIG. 3 is a schematic view showing the main software configuration of the terminal according to the first embodiment.
FIG. 4 is a view showing an example of a buffer Buff according to the first embodiment.

FIG. 3 is a schematic view showing the main software configuration of the terminal 1020.

As shown in FIG. 3, the terminal 1020 includes a control section 1100 which controls each section, a GPS section 1102 corresponding to the terminal GPS device 1032 shown in FIG. 2, a clock section 1104 corresponding to the clock 1038, and the like.

The terminal 1020 also includes a first storage section 1110 which stores various programs, and a second storage section 1150 which stores various types of information.

As shown in FIG. 3, the terminal 1020 includes a buffer (hereinafter called "Buff") in the second storage section 1150. The buffer Buff is a storage area allocated in the second storage section 1150.

FIG. 4 is a view showing an example of the buffer Buff.

As shown in FIG. 4, positions P(n-1) to P(n-10) are held in the buffer Buff. The positions P(n-1) and the like may be generically called positions P.

The positions P(n-1) and the like are positions stored in the buffer Buff during previous positioning (single-shot positioning or multi-shot positioning described later).

Calculation times t(n-1) and the like of the positions P(n-1) and the like are held in the buffer Buff respectively corresponding to the positions P(n-1) and the like.

Moving velocities v(n-1) and the like of the terminal 1020 when calculating the positions P(n-1) and the like are held in the buffer Buff respectively corresponding to the positions P(n-1) and the like.

The positions P(n-1) and the like exemplify reference positions. The buffer Buff exemplifies a position holding section.

As shown in FIG. 3, the terminal 1020 stores satellite orbital information 1152 in the second storage section 1150. The satellite orbital information 1152 includes an almanac 1152*a* and an ephemeris 1152*b*.

The almanac 1152*a* is information indicating the approximate orbits of all the GPS satellites 12*a* and the like (see FIG. 1). The almanac 1152*a* can be decoded and acquired from any of the signals G1 and the like from the GPS satellites 12*a* and the like.

The ephemeris 1152*b* is information indicating the accurate orbit of each of the GPS satellites 12*a* and the like (see FIG. 1). In order to acquire the ephemeris 1152*b* of the GPS satellite 12*a*, it is necessary to receive the signal G1 from the GPS satellite 12*a* and decode the signal G1, for example.

The terminal 1020 utilizes the satellite orbital information 1152 for positioning.

As shown in FIG. 3, the terminal 1020 stores a satellite signal reception program 1112 in the first storage section 1110. The satellite signal reception program 1112 is a program for causing the control section 1100 to receive the signals G1 and the like from the GPS satellites 12*a* and the like.

In more detail, the control section 1100 determines the GPS satellites 12*a* and the like which can be observed at the present time referring to the almanac 1152*a*, and receives the signals G1 and the like from the observable GPS satellites 12*a* and the like. In this case, the control section 1100 uses the preceding position P(n-1) held in the buffer Buff as the position of the terminal 1020 (reference), for example.

As shown in FIG. 3, the terminal 1020 stores a positioning program 1114 in the first storage section 1110. The positioning program 1114 is a program for causing the control section 1100 to calculate the present located position Pg(n) based on the signals G1 and the like received by the GPS section 1102. The located position Pg(n) exemplifies the present located position.

In more detail, the control section 1100 receives the signals G1 and the like from three or more GPS satellites 12*a* and the like, and calculates the pseudo-range (i.e. distance between each of the GPS satellites 12a and the like and the terminal 1020) from the delay time which is the difference between the time at which the signals G1 and the like are transmitted from the GPS satellites 12a and the like and the time at which the signals G1 and the like reach the terminal 1020. The control section 1100 calculates (locates) the present position using the pseudo-range and the positions of the GPS satellites 12a and the like in the satellite orbits calculated using the ephemeris 1152b of the GPS satellites 12a and the like.

The control section 1100 stores located position information 1154 indicating the present located position Pg(n) in the second storage section 1150. The located positions Pg(n) and the like at the respective times may be generically called a located position Pg.

FIG. 5 is a view showing the types of positioning performed based on the positioning program 1114.

The types of positioning are classified into single-shot positioning shown in FIG. 5A and multi-shot positioning shown in FIG. 5B.

As shown in FIG. 5A, single-shot positioning is a positioning mode in which positioning is terminated when the variation in the located position Pg has fallen within a predetermined convergence range or a stable position Pst has been calculated. The term "predetermined convergence range" used herein refers to a range in which the variation in two or more located positions Pg(n) is 100 meters (m) or less, for example. The term "stable position Pst" used herein refers to an average position Pav initially calculated by the terminal 1020. The average position Pav is described later. The terminal 1020 also calculates the average position Pav during single-shot positioning. For example, when single-shot positioning is specified to perform fifteen positioning operations at intervals of one second (s), the terminal 1020 calculates the average position Pav during the first and subsequent positioning operations when stationary conditions B described later are satisfied.

As shown in FIG. 5B, multi-shot positioning is a positioning mode in which positioning is terminated when the variation in the located position Pg has fallen within the predetermined convergence range or the stable position Pst has been calculated, and positioning has been performed for a predetermined period of time or a predetermined number of times.

As described above, single-shot positioning and multi-shot positioning include a plurality of positioning operations. Since the positioning operations are performed within a predetermined period of time, single-shot positioning and multi-shot positioning are performed within a positioning time involving a plurality of positioning operations.

Note that continuous positioning may be added in which positioning is continuously performed after the variation in the located position Pg has fallen within a predetermined convergence range or the stable position Pst has been calculated until the user inputs a positioning finish instruction, differing from this embodiment.

The control section 1100 calculates the positioning time t(n), at which the located position Pg(n) is calculated, based on the positioning program 1114. The positioning time t(n) is the GPS time calculated during the positioning process.

The control section 1100 stores positioning time information 1156 indicating the positioning time t(n) in the second storage section 1150. The positioning time t(n) is also called the present time t(n).

The positioning program 1114 is also a program for causing the control section 1100 to calculate the moving velocity of the terminal 1020 based on the signals G1 and the like.

In more detail, the control section 1100 calculates the relative velocities of the GPS satellites 12a and the like and the terminal 1020 based on the Doppler shift and the like of the signals G1 and the like from the GPS satellites 12a and the like, and calculates the moving velocity v(n) of the terminal 1020 (see paragraphs [0016] to [0018] of JP-A-8-68651, for example).

The control section 1100 stores moving velocity information 1158 indicating the moving velocity v(n) in the second storage section 1150. The moving velocity v(n) is also called the present velocity v(n).

As shown in FIG. 3, the terminal 1020 stores an elapsed time evaluation program 1116 in the first storage section 1110.

The elapsed time evaluation program 1116 is a program for causing the control section 1100 to determine whether or not the elapsed time between each of the times t(n-1) and the like in the buffer Buff and the present time t(n) is equal to or less than a time threshold value $\alpha$. The time threshold value $\alpha$ is specified in advance. The time threshold value $\alpha$ is 180 seconds (s), for example. A time range within 180 seconds (s) exemplifies an allowable time range.

As shown in FIG. 3, the terminal 1020 stores a velocity evaluation program 1118 in the first storage section 1110.

The velocity evaluation program 1118 is a program for causing the control section 1100 to determine whether or not the present velocity v(n) and the velocities v(n-1) and the like in the buffer Buff are equal to or less than a velocity threshold value $\beta$. The velocity threshold value $\beta$ is specified in advance. The velocity threshold value $\beta$ is 0.5 meters per second (m/s), for example. A velocity range within 0.5 meters per second (m/s) exemplifies a velocity allowable range.

As shown in FIG. 3, the terminal 1020 stores a distance evaluation program 1120 in the first storage section 1110.

The distance evaluation program 1120 is a program for causing the control section 1100 to determine whether or not the distance between each of the positions P(n-1) and the like in the buffer Buff and the present position Pg(n) is equal to or less than a distance threshold value $\gamma$. The distance threshold value $\gamma$ is specified in advance. The distance threshold value $\gamma$ is 15 meters (m), for example. A distance range within 15 meters (m) exemplifies an allowable distance range.

As shown in FIG. 3, the terminal 1020 stores a cumulative distance evaluation program 1122 in the first storage section 1110. The cumulative distance evaluation program 1122 is a program for causing the control section 1100 to determine whether or not the cumulative distance which is the path length between each of the positions P(n-1) and the like and the present located position Pg(n) is equal to or less than a predetermined cumulative distance threshold value $\gamma$s.

FIG. 6 is a view illustrative of the process based on the cumulative distance evaluation program 1122.

Figures 6A, 6B:
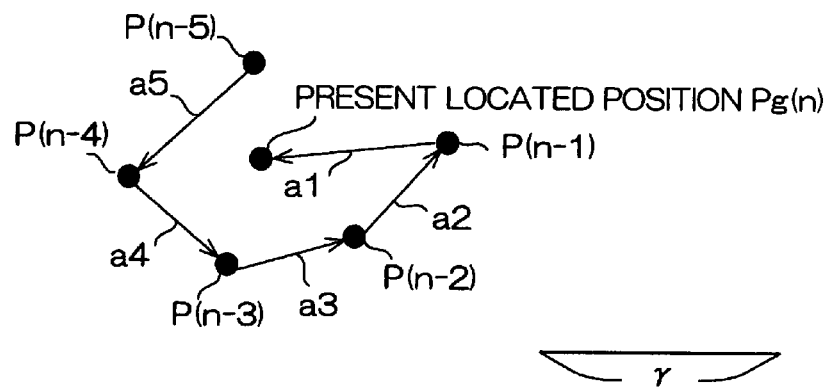
FIGS. 6A and 6B are views illustrative of a process based on a cumulative distance evaluation program according to the first embodiment.

For example, the true position of the terminal 1020 moves from the position P(n-5) to the position P(n-4), moves from the position P(n-4) to the position P(n-3), moves from the position P(n-3) to the position P(n-2), moves from the position P(n-2) to the position P(n-1), and moves from the position P(n-1) to the located position Pg(n), as shown in FIG. 6A.

When the terminal 1020 moves circularly in this manner and the located position Pg(n) indicates the coordinates of the center of the circle, the distance between the located position Pg(n) and each of the positions P(n-5) to P(n-1) may be equal to or less than the distance threshold value $\gamma$.

Therefore, whether or not the terminal 1020 moves cannot be accurately determined even if the conditions are merely satisfied that the distance between the located position Pg(n) and each of the positions P(n-5) to P(n-1) is equal to or less than the distance threshold value $\gamma$.

As shown in FIG. 6B, the control section 1100 determines whether or not the distance a1 between the position P(n-1) and the present position Pg(n) is equal to or less than the cumulative distance threshold value γs based on the cumulative distance evaluation program 1122. The control section 1100 then determines whether or not the cumulative distance a1+a2 obtained by adding the distance a2 between the position P(n-2) and the present position Pg(n) to the distance a1 is equal to or less than the cumulative distance threshold value γs. The control section 1100 then determines whether or not the cumulative distance a1+a2+a3 obtained by adding the distance a3 between the position P(n-3) and the present position Pg(n) to the cumulative distance a1+a2 is equal to or less than the cumulative distance threshold value γs.

As described above, the control section 1100 calculates the path length (cumulative distance) between each of the positions P(n-1) and the like and the present located position Pg(n) and determines whether or not the cumulative distance is equal to or less than the cumulative distance threshold value γs. The cumulative distance threshold value γs is specified in advance. The cumulative distance threshold value γs is 20 meters (m), for example. The range of the cumulative distance threshold value γs exemplifies an allowable cumulative distance range.

As shown in FIG. 3, the terminal 1020 stores a stationary state determination program 1124 in the first storage section 1110. The stationary state determination program 1124 is a program for causing the control section 1100 to determine whether or not each of the positions P(n-1) and the like in the buffer Buff satisfies stationary conditions B. The stationary state determination program 1124 and the control section 1100 exemplify a stationary condition determination section.

FIG. 7 is a view illustrative of the process based on the stationary state determination program 1124.

As shown in FIG. 7, the stationary conditions B are satisfied when all of a condition 1, a condition 2, a condition 3, and a condition 4 are satisfied. The stationary conditions B exemplify stationary conditions.

The condition 1 is a condition whereby the present velocity v(n) and the velocities v(n-1) and the like in the buffer Buff are equal to or less than the velocity threshold value β. For example, the condition 2 is satisfied when the present velocity v(n) and the velocity v(n-1) are equal to or less than the velocity threshold value β.

The condition 2 is a condition whereby the elapsed time is equal to or less than the time threshold value α.

The condition 3 is a condition whereby the distance between the present located position Pg(n) and each of the positions P(n-1) and the like is equal to or less than the distance threshold value γ.

The condition 4 is a condition whereby the cumulative distance is equal to or less than the cumulative distance threshold value γs.

The control section 1100 determines whether or not the positions in the buffer Buff satisfy the stationary conditions B based on the stationary state determination program 1124 in the order from the latest position.

In more detail, the control section 1100 determines whether or not the present moving velocity v(n) is equal to or less than the velocity threshold value β. When the control section 1100 has determined that the present moving velocity v(n) is not equal to or less than the velocity threshold value β, the control section 1100 terminates the determination of the stationary conditions B without determining whether or not each position P(n-1) satisfies the stationary conditions B.

When the control section 1100 has determined that the present moving velocity v(n) is equal to or less than the velocity threshold value β, the control section 1100 determines whether or not each position P(n-1) satisfies the stationary conditions B with respect to the relationship with the present located position Pg(n). The control section 1100 then determines whether or not the present located position Pg(n) and the position P(n-2) satisfy the stationary conditions B. As described above, the control section 1100 determines whether or not the positions P(n-1) and the like satisfy the stationary conditions B in the order from the latest position, and terminates the determination of the stationary conditions B when the control section 1100 has determined that the positions P(n-1) and the like do not satisfy the stationary conditions B.

As shown in FIG. 3, the terminal 1020 stores an average position calculation program 1126 in the first storage section 1110. The average position calculation program 1126 is a program for causing the control section 1100 to average the positions P(n-1) and the like satisfying the stationary conditions B and the present located position Pg(n) calculated by positioning to calculate the average position Pav. The average position Pav exemplifies an average position. The average position calculation program 1126 and the control section 1100 exemplify an average position calculation section.

FIG. 8 is a view illustrative of the process based on the average position calculation program 1126.

As shown in FIG. 8, when the positions P satisfying the stationary conditions B are the positions P(n-1), P(n-2), P(n-3), P(n-4), and P(n-5), the control section 1100 calculates the average position of the positions P(n-1) to P(n-5) and the located position Pg(n).

The control section 1100 calculates the average position of all of the positions P satisfying the stationary conditions B and the located position Pg(n). For example, when all of the positions P in the buffer Buff satisfy the stationary conditions B, the control section 1100 averages eleven positions including the located position Pg(n).

The control section 1100 stores average position information 1160 indicating the average position Pav in the second storage section 1150.

As shown in FIG. 3, the terminal 1020 stores a position output program 1128 in the first storage section 1110. The position output program 1128 is a program for causing the control section 1100 to output the average position Pav or the located position Pg(n). The position output program 1128 and the control section 1100 exemplify a position output section.

In more detail, the control section 1100 displays the average position Pav on the display device 1036 (see FIG. 2) when the position P satisfies the stationary conditions B.

On the other hand, the control section 1100 displays the located position Pg(n) on the display device 36 when the position P does not satisfy the stationary conditions B.

As shown in FIG. 3, the terminal 1020 stores a position storage program 1130 in the first storage section 1110. The position storage program 1130 is a program for causing the control section 1100 to store the average position Pav or the located position Pg(n) in the buffer Buff. The position storage program 1130 and the control section 1100 exemplify a position storage section.

When the control section 1100 has displayed the average position Pav on the display device 1036, the control section 1100 stores the average position Pav in the buffer Buff as the new position P(n-1).

When the control section 1100 has displayed the position Pg(n) on the display device 1036, the control section 1100 stores the position Pg(n) in the buffer Buff as the new position P(n-1).

FIG. 9 shows an example of the buffer Buff.

The terminal 1020 is configured as described above.

As described above, the terminal 1020 can average the positions P(n-1) and the like satisfying the stationary conditions B and the present located position Pg(n) calculated by positioning to calculate the average position Pav. Specifically, the terminal 1020 does not average (correct) the expected position estimated from the preceding located position, the preceding velocity vector, and the elapsed time and the present located position Pg(n). The terminal 1020 averages the positions P(n-1) and the like satisfying the stationary conditions B and the present located position Pg(n) calculated by positioning to calculate the average position Pav. Therefore, the accuracy of the preceding velocity vector does not affect the correction of the present located position Pg(n).

When the terminal 1020 remains stationary, the located position Pg(n) is continuously indicated by the coordinates near the true position. The average position Pav is located closer to the true position since the variation has been reduced by averaging. On the other hand, the true position does not necessarily exist near the expected position.

Specifically, the position P satisfying the stationary conditions B is highly reliable. Moreover, a plurality of positions P may satisfy the stationary conditions B.

Therefore, the output position becomes very close to the true position by averaging the positions P(n-1) and the like and the present located position Pg(n) and outputting the average position Pav in comparison with the case of outputting a position obtained by averaging the expected position and the present located position Pg(n).

This allows a reliable and accurate position to be output.

Since the stationary state of the terminal 1020 is determined based on the stationary conditions B using a plurality of criteria (i.e. moving velocity, elapsed time, and distance), whether or not the terminal 1020 is in a stationary state can be accurately determined.

Since the stationary conditions B include the condition whereby the cumulative distance is equal to or less than the cumulative distance threshold value γs, the terminal 1020 can determine the stationary state based on the cumulative distance, even when the terminal 1020 moves circularly within a short range and the stationary state of terminal 1020 cannot be determined based on the distance.

The configuration of the terminal 1020 according to this embodiment has been described above. An operation example of the terminal 1020 is described below mainly using FIG. 10.

Figure 10:
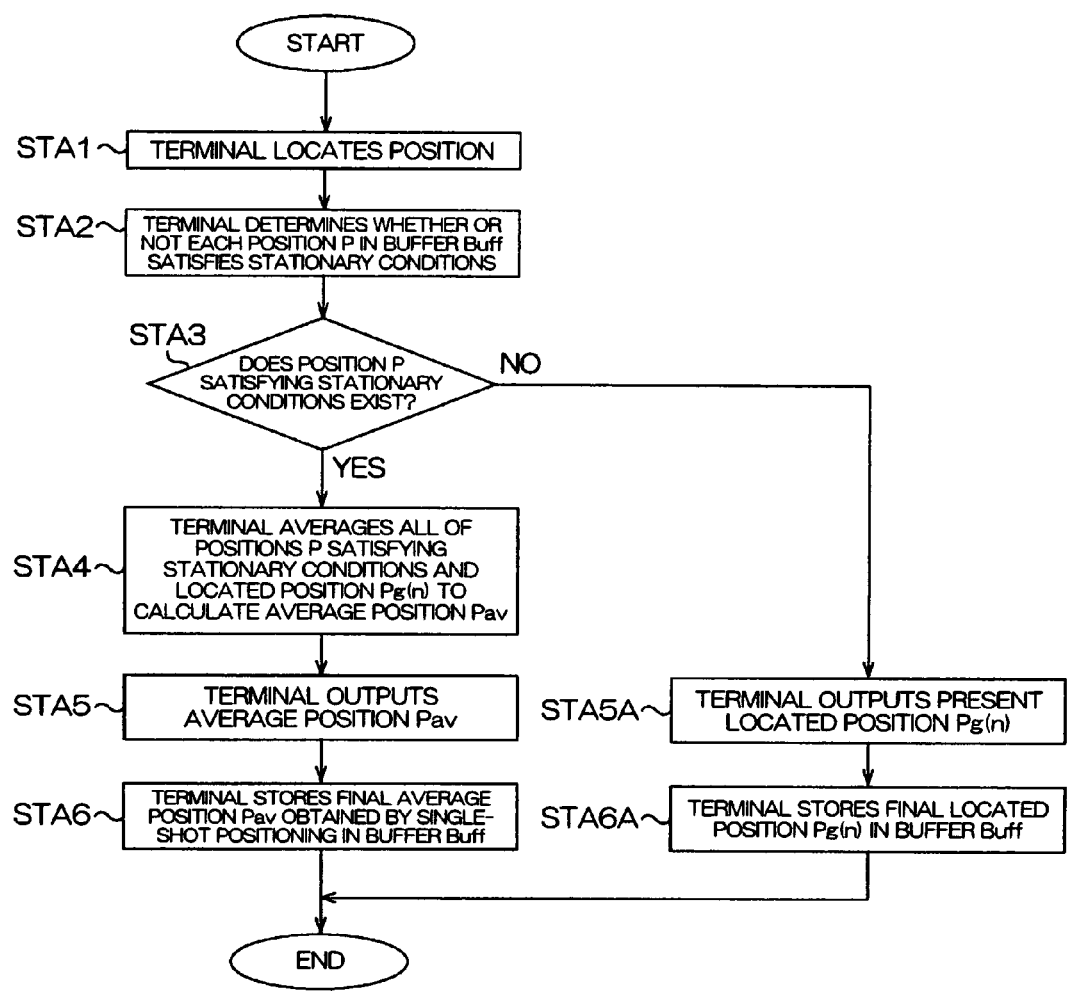
FIG. 10 is a schematic flowchart showing an operation example of the terminal according to the first embodiment.

FIG. 10 is a schematic flowchart showing an operation example of the terminal 1020 according to this embodiment.

The following description is given on the assumption that the terminal 1020 performs single-shot positioning (see FIG. 5A) in FIG. 10.

The terminal 1020 locates the position (step STA1 in FIG. 10).

The terminal 1020 determines whether or not each of the positions P(n-1) and the like in the buffer Buff satisfies the stationary conditions B (step STA2). The step STA2 exemplifies a stationary condition determination step.

The terminal 1020 determines whether or not the positions P(n-1) and the like satisfying the stationary conditions B exist (step STA3).

When the terminal 1020 has determined that the positions P(n-1) and the like satisfying the stationary conditions B exist in the step STA3, the terminal 1020 averages all of the positions P(n-1) and the like satisfying the stationary conditions B and the located position Pg(n) to calculate the average position Pav (step STA4). The step STA4 exemplifies an average position calculation section.

The terminal 1020 outputs the average position Pav (step STA5). The step STA5 exemplifies a position output step.

The terminal 1020 stores the final average position Pav obtained by single-shot positioning in the buffer Buff as the position P(n-1) (step STA6). The step STA6 exemplifies a position storage step.

When the terminal 1020 has determined that the positions P(n-1) and the like satisfying the stationary conditions B do not exist in the step STA3, the terminal 1020 outputs the present located position Pg(n) (step STA5A).

When the terminal 1020 has not calculated the average position Pav in the final positioning operation during single-shot positioning, the terminal 1020 stores the final located position Pg(n) in the buffer Buff (step STA6A).

The above steps allow a reliable and accurate position to be output in a stationary state.

Since the terminal 1020 outputs the located position Pg(n) when the terminal 1020 is not in a stationary state, a position corresponding to the moving state can be output.

First Modification of First Embodiment

A first modification of the first embodiment is described below. The configuration of a terminal 1020A (see FIG. 1) according to this modification is similar to the configuration of the terminal 1020 according to the first embodiment. Therefore, the same sections are indicated by the same symbols, and description thereof is omitted. The following description mainly focuses on how the terminal 1020A differs from the terminal 1020 according to the first embodiment.

FIG. 11 is a view showing the velocity threshold value β, the distance threshold value γ, and the like of the terminal 1020A.

In the terminal 1020A, the velocity threshold value β is set at 0.5 meters per second (m/s) in an intense electric field, as shown in FIG. 11. The velocity threshold value β is set at 0.75 meters per second (m/s) in an intermediate electric field. The velocity threshold value β is set at 2 meters per second (m/s) in a weak electric field.

The intense electric field refers to a signal strength of −135 dBm or more, for example.

The intermediate electric field refers to a signal strength of −150 dBm or more and less than −135 dBm, for example.

The weak electric field refers to a signal strength of less than −150 dBm, for example.

In the terminal 1020A, the distance threshold value γ is set at 15 meters (m) in an intense electric field. The distance threshold value γ is set at 30 meters (m) in an intermediate electric field. The distance threshold value γ is set at 100 meters (m) in a weak electric field.

As described above, the velocity threshold value β and the distance threshold value are specified corresponding to the reception environment.

This enables the terminal 1020A to appropriately determine the stationary state corresponding to the reception environment.

Note that the time threshold value α and the cumulative distance threshold value γs are fixed values.

FIG. 12 is a view illustrative of the process based on a position storage program 1130A (see FIG. 3).

As shown in FIG. 12, the control section 1100 stores the located position Pg in the buffer Buff based on the position storage program 1130A until the number of positions Pg in the buffer Buff reaches a predetermined number "5". The number "5" is specified in advance.

In more detail, the control section 1100 stores the located position Pg in the buffer Buff until the number of positions Pg reaches five, as indicated by (1) to (5) in FIG. 12.

After the number of positions Pg has reached five, the control section 1100 stores the average position Pav in the buffer Buff when the control section 1100 has calculated the average position Pav, as indicated by (6) to (10) in FIG. 12.

FIG. 13 is a view showing a comparative example of the first modification.

Figure 13A:
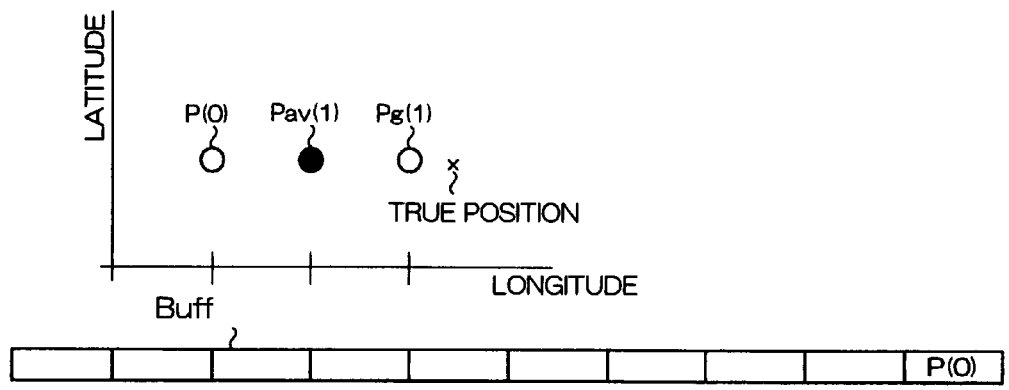
FIGS. 13A and 13B are views showing a comparative example according to the first modification of the first embodiment.

As shown in FIG. 13A, the initial located position Pg is stored in the buffer Buff as the initial position P(0), and the position near the true position is located to calculate the located position Pg(1). In this case, the average position of the positions P(0) and Pg(1) is the position Pav(1).

Figure 13B:
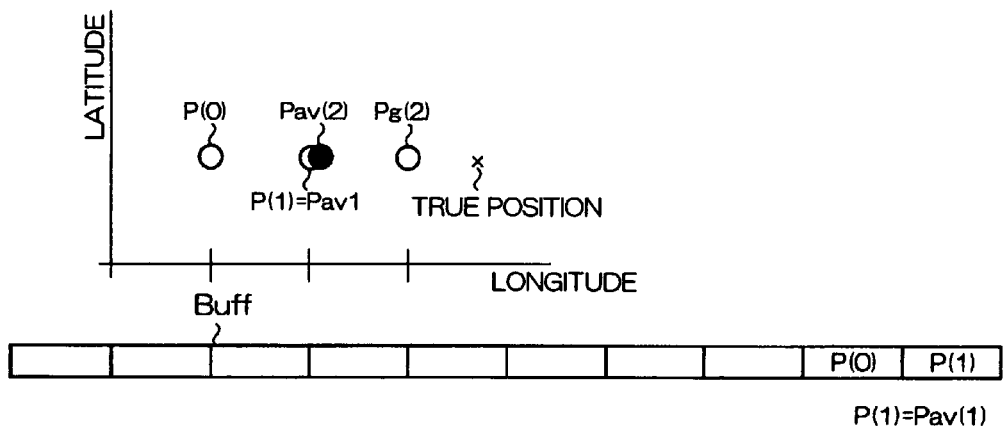

As shown in FIG. 13B, the average position Pav(1) is stored in the buffer Buff as the position P(1), and the position near the true position is located to calculate the located position Pg(2). In this case, the average position of the positions P(0), P(1), and Pg(2) is the position Pav(2).

Specifically, if the average position Pav is stored in the buffer Buff in the initial stage of storing the position P in the buffer Buff, the average position Pav may not promptly approach the true position due to significant effects of the initial position P(0).

FIG. 14 is a view showing an example of the method of storing the position in the buffer Buff according to the first modification.

Figure 14A:
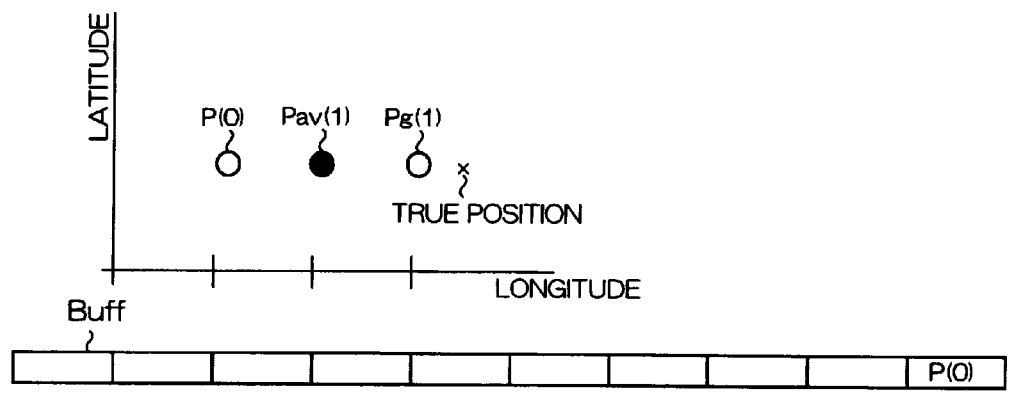
FIGS. 14A and 14B are views showing a method of storing a position in the buffer Buff according to the first modification of the first embodiment.

As shown in FIG. 14A, the located position Pg is stored in the buffer Buff as the initial position P(0), and the position near the true position is located to calculate the located position Pg(1). In this case, the average position of the positions P(0) and Pg(1) is the position Pav(1).

Figure 14B:
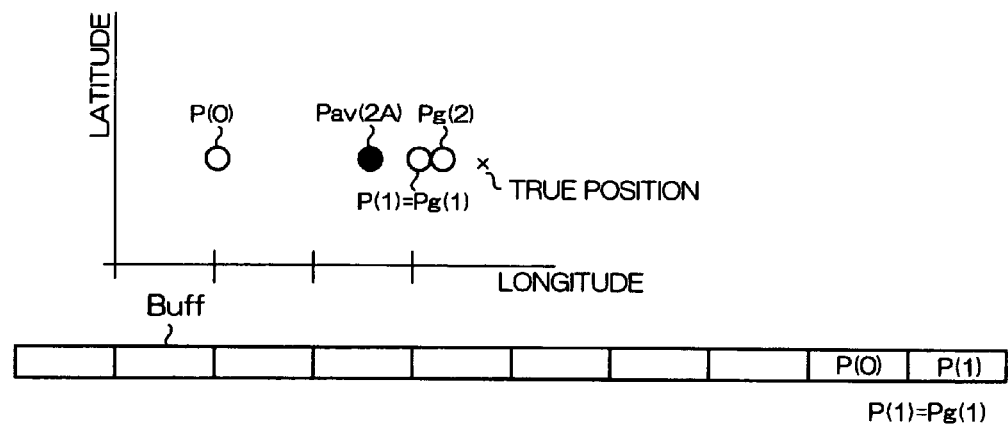

As shown in FIG. 14B, the located position Pg(1) is stored in the buffer Buff as the position P(1), and the position near the true position is located to calculate the located position Pg(2). In this case, the average position of the positions P(0), P(1), and Pg(2) is the position Pav(2A). The average position Pav(2A) is closer to the true position than the average position Pav(2) of the comparative example.

Specifically, the effects of the initial position P(0) can be reduced by storing the located position Pg in the buffer Buff instead of the average position Pav in the initial stage of storing the position P in the buffer Buff, whereby the average position Pav can be promptly brought close to the true position.

As described above, even if the position P initially stored in the buffer Buff differs from the true position to a large extent, the terminal 1020A can promptly reduce its effects.

Second Modification of First Embodiment

A second modification of the first embodiment is described below. The configuration of a terminal 1020B (see FIG. 1) according to the second modification is similar to the configuration of the terminal 1020 according to the first embodiment. Therefore, the same sections are indicated by the same symbols, and description thereof is omitted. The following description mainly focuses on the difference from the terminal 1020 according to the first embodiment.

Figure 15A:
FIGS. 15A, 15B and 15C are views illustrative of a process based on a position storage program according to a second modification of the first embodiment.
Figure 15B:
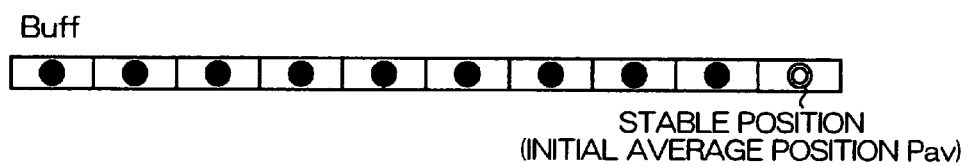
Figure 15C:
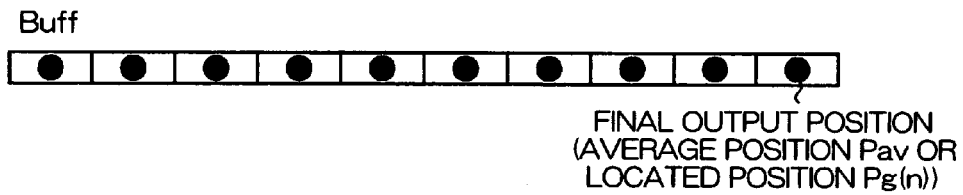

FIG. 15 is a view illustrative of the process based on a position storage program 1130B (see FIG. 3) stored in the first storage section 1110 of the terminal 1020B.

The position storage program 11 30B functions during multi-shot positioning (see FIG. 5B).

As shown in FIG. 15A, ten positions P are held in the buffer Buff. When the terminal 1020B has started multi-shot positioning in this state, the control section 1100 stores the average position Pav (stable position Pst) initially calculated within the positioning time in the buffer Buff based on the position storage program 1130B.

The control section 1100 updates the stable position Pst with the last calculated average position Pav when finishing multi-shot positioning.

When the control section 1100 has output the located position Pg without last calculating and outputting the average position Pav, the control section 1100 updates the stable position Pst with the last located position Pg.

The variation in the located position Pg may fall within a predetermined convergence range during multi-shot positioning. However, the terminal 1020B stores the stable position Pst in the buffer Buff without storing the located position Pg when the variation falls within a predetermined convergence range in the buffer Buff. Specifically, even if the variation in the located position Pg falls within a predetermined convergence range, the located position Pg when the variation falls within a predetermined convergence range may differ from the true position to a large extent ("position jump") due to positioning errors. If such a position is stored in the buffer Buff, the subsequent averaging may be adversely affected.

Since the terminal 1020B stores the stable position Pst in the buffer Buff, as described above, the terminal 1020B can promptly store the new position P in the buffer Buff. Therefore, the terminal 1020B can promptly store the new position in the buffer Buff without waiting for the multi-shot positioning finish time. This allows the subsequent average position Pav to promptly reflect the new position.

Moreover, since the terminal 1020B updates the stable position Pst with the last calculated average position Pav, the terminal 1020B can store an accurate position in the buffer Buff when the positioning time expires.

FIG. 16 is a view showing the velocity threshold value $\beta$, the distance threshold value $\gamma$, and the like of the terminal 1020B.

In the terminal 1020B, the velocity threshold value $\beta$ in an intense electric field is changed from 0.5 meters per second (m/s) to 0.3 meters per second (m/s) after calculating the stable position Pst, as shown in FIG. 16. The velocity threshold value $\beta$ in an intermediate electric field is changed from 0.75 meters per second (m/s) to 0.6 meters per second (m/s). The velocity threshold value $\beta$ in a weak electric field is changed from 2 meters per second (m/s) to 1.2 meters per second (m/s).

In the terminal 1020B, the distance threshold value $\gamma$ in an intense electric field is changed from 15 meters (m) to 10 meters (m) after calculating the stable position Pst. The distance threshold value $\gamma$ in an intermediate electric field is changed from 30 meters (m) to 20 meters (m). The distance threshold value $\gamma$ in a weak electric field is changed from 100 meters (m) to 70 meters (m).

As described above, the velocity threshold value $\beta$ and the distance threshold value $\gamma$ are reduced after calculating the stable position Pst. In other words, the stationary conditions are made more severe after calculating the stable position.

If the average position Pav is calculated and held in the buffer Buff, the position in the buffer Buff used to determine the stationary conditions B reflects the latest position.

Therefore, the terminal 1020B can more accurately determine the stationary state by causing the latest position to be reflected and making the stationary conditions B more severe.

FIG. 17 is a view illustrative of the process based on the stationary state determination program 11 24B stored in the first storage section 1110 of the terminal 1020B.

Figure 17A:
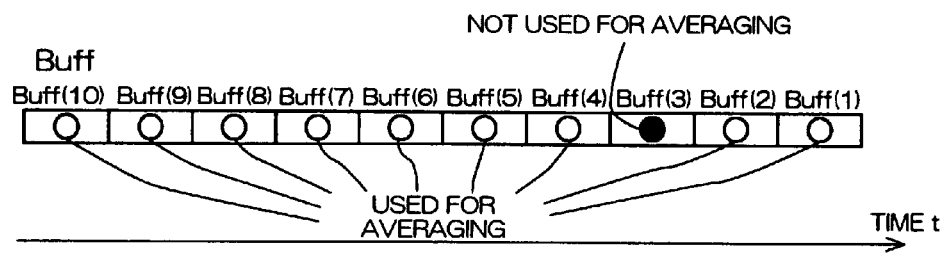
FIGS. 17A and 17B are views illustrative of a process based on a stationary state determination program according to the second modification of the first embodiment.
Figure 17B:
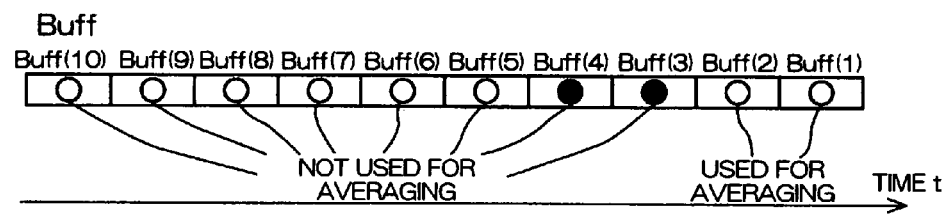

As shown in FIGS. 17A and 17B, when the present velocity v(n) is equal to or less than the velocity threshold value β, the control section 1100 determines whether or not the positions in the buffer Buff satisfy the stationary conditions B based on the stationary state determination program 1124B in the order from the latest position.

In more detail, the control section 1100 determines whether or not the stationary conditions B are satisfied in the order from the latest position, such as determining whether or not the position P(n-1) in the buffer Buff(1) satisfies the stationary conditions B, and then determining whether or not the position P(n-2) in the buffer Buff(2) satisfies the stationary conditions B.

As shown in FIG. 17A, even if the position P(n-3) in the buffer Buff(3) does not satisfy the stationary conditions B, the control section 1100 continuously determines whether or not the position P (n-4) in the buffer Buff(4) and the like satisfy the stationary conditions B based on the stationary state determination program 1124B.

In the example shown in FIG. 17A, all of the positions P other than the position P(n-3) in the buffer Buff(3) which does not satisfy the stationary conditions B are used to calculate the average position Pav.

As shown in FIG. 17B, when the position P(n-3) in the buffer Buff(3) does not satisfy the stationary conditions B and the subsequent position P(n-4) in the buffer Buff(4) does not satisfy the stationary conditions B, the control section 1100 stops determining whether or not the stationary conditions B are satisfied based on the stationary state determination program 1124B.

The control section 1100 does not use the positions P held in the buffers Buff(3), Buff(4), Buff(5) and the like to calculate the average position Pav, and uses only the positions P held in the buffers Buff(1) and Buff(2) satisfying the stationary conditions B to calculate the average position Pav.

As described above, the control section 1100 averages the positions using the position P satisfying the stationary conditions B as long as a state in which the position P in the buffer Buff does not satisfy the stationary conditions B does not continuously occur.

Therefore, even if one position (position P in the buffer Buff(3) in FIG. 17A) has a large error and the control section 1100 has erroneously determined that the stationary conditions B are not satisfied, since the positions P calculated before the above position can be used for averaging, a sufficient number of positions P can be provided for averaging, whereby the accuracy of the average position Pav can be improved.

(Program, Computer-Readable Recording Medium, and the Like)

A program for controlling a positioning device may be provided which causes a computer to execute the stationary condition determination step, the average position calculation step, the position output step, the position storage step, and the like of the above-described operation example.

A computer-readable recording medium having such a program for controlling a positioning device recorded thereon and the like may also be provided.

A program storage medium used to install the program for controlling a positioning device and the like in a computer to allow the program and the like to be executable by the computer may be implemented by a packaging medium such as a flexible disk such as a floppy disk (registered trademark), a compact disc read only memory (CD-ROM), a compact disc-recordable (CD-R), a compact disc-rewritable (CD-RW), or a digital versatile disc (DVD), a semiconductor memory, a magnetic disk, or a magnetooptical disk in which the program is stored temporary or permanently, or the like.

Second Embodiment

FIG. 18 is a schematic view showing a terminal 2020 and the like according to a second embodiment of the invention.

As shown in FIG. 18, the terminal 2020 is held by a user A. The terminal 2020 can receive signals G1, G2, G3, G4, G5, G6, G7, and G8 from GPS satellites 12a, 12b, 12c, 12d, 12e, 12f, 12g, and 12h (positioning satellites), for example. The signals G1 and the like exemplify satellite signals. The terminal 1020 exemplifies a positioning device.

The user A has met with an accident on a mountain path MR and awaits rescue, for example. When the user A remains stationary, the terminal 2020 also remains stationary. The true position of the terminal 2020 is a position r1. The terminal 2020 can allow the user A to be reliably rescued by outputting a position close to the true position r1 as much as possible in a state in which the terminal 2020 actually remains stationary.

When the user A walks away, the terminal 2020 moves at a low speed. In this case, the true position of the terminal 2020 gradually moves away from the position r1. The terminal 2020 can allow the user A to be reliably rescued by outputting a position corresponding to the low-speed movement in a state in which the terminal 2020 moves at a low speed.

However, the GPS satellite 12a and the like move in the satellite orbits, and the reception state of the signal G1 and the like changes from moment to moment. Therefore, the located position also changes from moment to moment. Accordingly, even if the terminal 2020 remains stationary, the located position changes in the order of located positions P0, P1, P2, P3, and P4 with the passage of time, for example.

Moreover, even if the terminal 2020 moves at a low speed, continuously calculated located positions may differ to a large extent, for example.

The terminal 2020 can output a reliable and accurate position corresponding to the movement state in a stationary state or a low-speed movement state as described below.

In this embodiment, a state in which the terminal 2020 remains stationary and a state in which the terminal 2020 moves is generically called a movement state.

The terminal 2020 is a portable car navigation system which can calculate (locate) the position and display the acquired position information together with map information, for example.

The terminal 2020 is a portable telephone, for example. The terminal 2020 may be a car navigation system, a personal handy-phone system (PHS), a personal digital assistance (PDA), or the like. Note that the terminal 2020 is not limited thereto.

The number of GPS satellites 12a and the like is not limited to eight. For example, the number of GPS satellites may be three or more and seven or less, or nine or more.

(Main Hardware Configuration of Terminal 2020)

Figure 19:
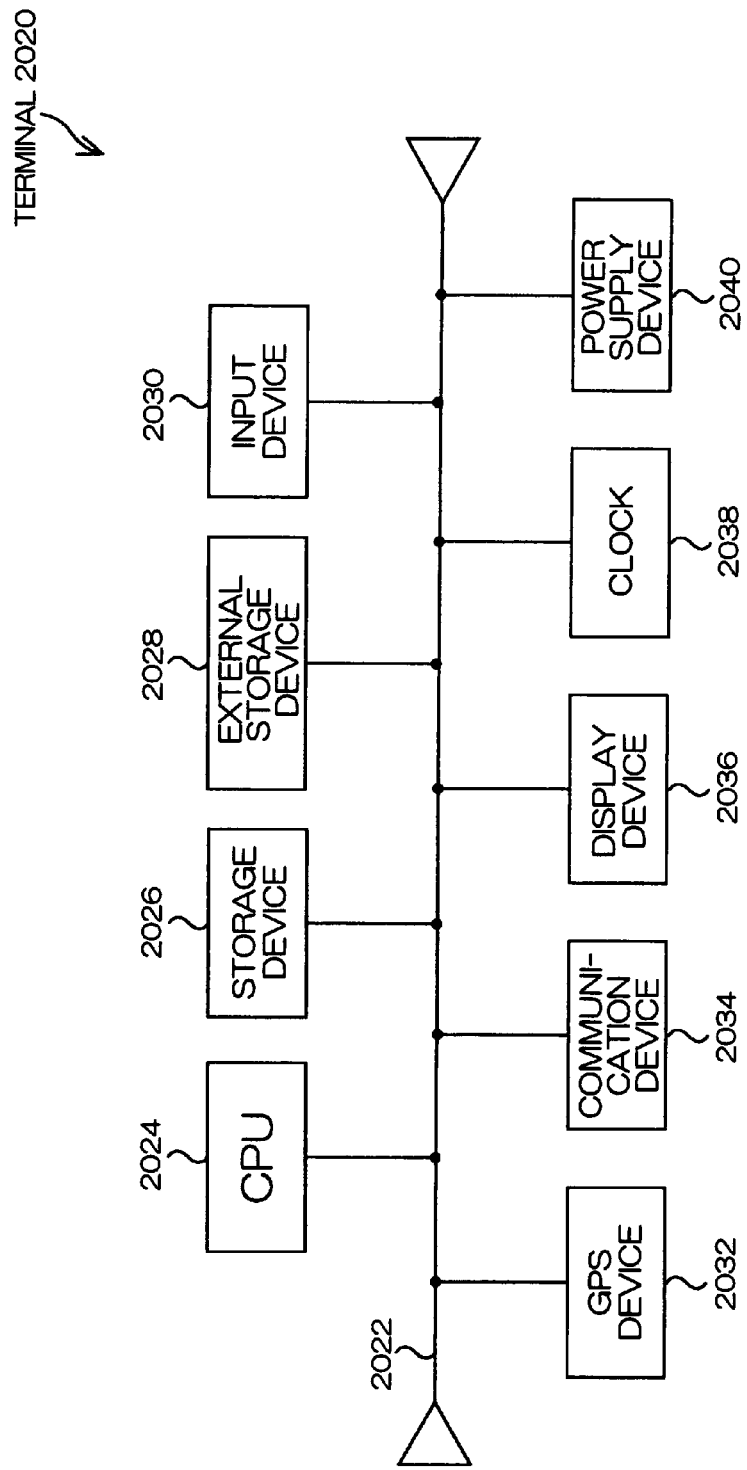
FIG. 19 is a schematic view showing the main hardware configuration of the terminal according to the second embodiment.

FIG. 19 is a schematic view showing the main hardware configuration of the terminal 2020.

As shown in FIG. 19, the terminal 2020 includes a computer which includes a bus 22.

A central processing unit (CPU) 2024, a storage device 2026, an external storage device 2028, and the like are connected with the bus 2022. The storage device 2026 is a random access memory (RAM), a read only memory (ROM), or the like. The external storage device 2028 is a hard disk drive (HDD) or the like.

An input device 2030 for inputting various types of information and the like, a GPS device 2032 for receiving the signals G1 and the like from the GPS satellites 12a and the like, a communication device 2034, a display device 2036 for displaying various types of information, a clock 2038, and a power supply device 2040 are also connected with the bus 2022.

(Main Software Configuration of Terminal 2020)

Figures 20, 21:
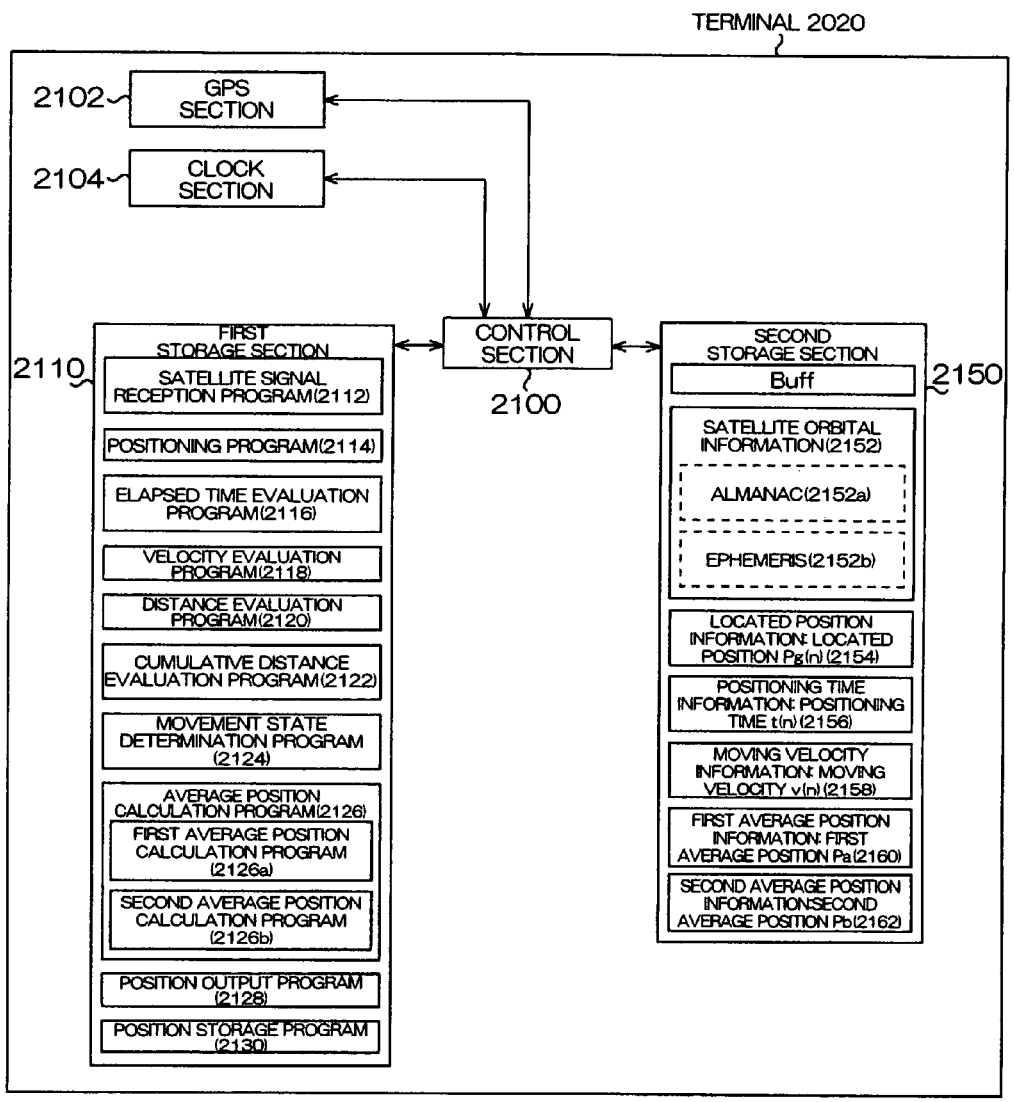
FIG. 20 is a schematic view showing the main software configuration of the terminal according to the second embodiment.
FIG. 21 is a view showing an example of a buffer Buff according to the second embodiment.

FIG. 20 is a schematic view showing the main software configuration of the terminal 2020.

As shown in FIG. 20, the terminal 2020 includes a control section 2100 which controls each section, a GPS section 2102 corresponding to the GPS device 2032 shown in FIG. 19, a clock section 2104 corresponding to the clock 2038, and the like.

The terminal 2020 also includes a first storage section 2110 which stores various programs, and a second storage section 2150 which stores various types of information.

As shown in FIG. 20, the terminal 2020 includes a buffer Buff in the second storage section 2150. The buffer Buff is a storage area allocated in the second storage section 2150.

FIG. 21 is a view showing an example of the buffer Buff.

As shown in FIG. 21, positions P(n-1) to P(n-10) are held in the buffer Buff. The positions P(n-1) and the like may be generically called positions P.

The positions P(n-1) and the like are positions stored in the buffer Buff during previous positioning (single-shot positioning or multi-shot positioning described later).

Calculation times t(n-1) and the like of the positions P(n-1) and the like are held in the buffer Buff respectively corresponding to the positions P(n-1) and the like.

Moving velocities v(n-1) and the like of the terminal 2020 when calculating the positions P(n-1) and the like are held in the buffer Buff respectively corresponding to the positions P(n-1) and the like.

The positions P(n-1) and the like exemplify reference positions. The buffer Buff exemplifies a position holding section.

As shown in FIG. 20, the terminal 2020 stores satellite orbital information 2152 in the second storage section 2150. The satellite orbital information 2152 includes an almanac 2152a and an ephemeris 2152b.

The almanac 2152a is information indicating the approximate orbits of all the GPS satellites 12a and the like (see FIG. 18). The almanac 2152a can be decoded and acquired from any of the signals G1 and the like from the GPS satellites 12a and the like.

The ephemeris 2152b is information indicating the accurate orbit of each of the GPS satellites 12a and the like (see FIG. 18). In order to acquire the ephemeris 2152b of the GPS satellite 12a, it is necessary to receive the signal G1 from the GPS satellite 12a and decode the signal G1, for example.

The terminal 2020 utilizes the satellite orbital information 2152 for positioning.

As shown in FIG. 20, the terminal 2020 stores a satellite signal reception program 2112 in the first storage section 2110. The satellite signal reception program 2112 is a program for causing the control section 2100 to receive the signals G1 and the like from the GPS satellites 12a and the like.

In more detail, the control section 2100 determines the GPS satellites 12a and the like which can be observed at the present time referring to the almanac 2152a, and receives the signals G1 and the like from the observable GPS satellites 12a and the like. In this case, the control section 2100 uses the preceding position P(n-1) held in the buffer Buff as the position of the terminal 2020 (reference), for example.

As shown in FIG. 20, the terminal 2020 stores a positioning program 2114 in the first storage section 2110. The positioning program 2114 is a program for causing the control section 2100 to calculate the present located position Pg(n) based on the signals G1 and the like received by the GPS section 2102. The located position Pg(n) exemplifies the present located position.

In more detail, the control section 2100 receives the signals G1 and the like from three or more GPS satellites 12a and the like, and calculates the pseudo-range (i.e. distance between each of the GPS satellites 12a and the like and the terminal 2020) from the delay time which is the difference between the time at which the signals G1 and the like are transmitted from the GPS satellites 12a and the like and the time at which the signals G1 and the like reach the terminal 2020. The control section 2100 calculates (locates) the present position using the pseudo-range and the positions of the GPS satellites 12a and the like in the satellite orbits calculated using the ephemeris 2152b of the GPS satellites 12a and the like.

The control section 2100 stores located position information 2154 indicating the present located position Pg(n) in the second storage section 2150. The located positions Pg (n) and the like at the respective times may be generically called a located position Pg.

FIG. 22 is a view showing the types of positioning performed based on the positioning program 2114.

The types of positioning are classified into single-shot positioning shown in FIG. 22A and multi-shot positioning shown in FIG. 22B.

As shown in FIG. 22A, single-shot positioning is a positioning mode in which positioning is terminated when the variation in the located position Pg has fallen within a predetermined convergence range or a stable position Pst has been calculated. The term "predetermined convergence range" used herein refers to a range in which the variation in two or more located positions Pg(n) is 100 meters (m) or less, for example. The term "stable position Pst" used herein refers to an average position Pa or Pb initially calculated by the terminal 2020. The average positions Pa and Pb are described later.

As shown in FIG. 22B, multi-shot positioning is a positioning mode in which positioning is terminated when the variation in the located position Pg has fallen within the predetermined convergence range or the stable position Pst has been calculated, and positioning has been performed for a predetermined period of time or a predetermined number of times.

As described above, single-shot positioning and multi-shot positioning include a plurality of positioning operations. Since the positioning operations are performed within a predetermined period of time, single-shot positioning and multi-shot positioning are performed within a positioning time involving a plurality of positioning operations.

Note that continuous positioning may be added in which positioning is continuously performed after the variation in the located position Pg has fallen within a predetermined convergence range or the stable position Pst has been calculated until the user inputs a positioning finish instruction, differing from this embodiment.

The control section 2100 calculates the positioning time t(n), at which the located position Pg(n) is calculated, based on the positioning program 2114. The positioning time t(n) is the GPS time calculated during the positioning process.

The control section 2100 stores positioning time information 2156 indicating the positioning time t(n) in the second storage section 2150. The positioning time t(n) is also called the present time t(n).

The positioning program 2114 is also a program for causing the control section 2100 to calculate the moving velocity of the terminal 2020 based on the signals G1 and the like.

In more detail, the control section 2100 calculates the relative velocities of the GPS satellites 12a and the like and the terminal 2020 based on the Doppler shift and the like of the signals G1 and the like from the GPS satellites 12a and the like, and calculates the moving velocity v(n) of the terminal 2020 (see paragraphs [0016] to [0018] of JP-A-8-68651, for example).

The control section 2100 stores moving velocity information 2158 indicating the moving velocity v(n) in the second storage section 2150. The moving velocity v(n) is also called the present velocity v(n).

As shown in FIG. 20, the terminal 2020 stores an elapsed time evaluation program 2116 in the first storage section 2110.

FIG. 23 is a view illustrative of the process based on the elapsed time evaluation program 2116.

As shown in FIG. 23, the control section 2100 determines whether or not the elapsed time between each of the times t(n-1) and the like in the buffer Buff and the present time t(n) is equal to or less than a time threshold value α1 based on the elapsed time evaluation program 2116. The time threshold value α1 is specified in advance. The time threshold value α1 is 180 seconds (s), for example.

The control section 2100 then determines whether or not the elapsed time between the latest time t(n-1) in the buffer Buff and the present time t(n) is equal to or less than a time threshold value α2. The time threshold value α2 is specified in advance. The time threshold value α2 is 60 seconds (s), for example.

As shown in FIG. 20, the terminal 2020 stores a velocity evaluation program 2118 in the first storage section 2110.

Figure 24:
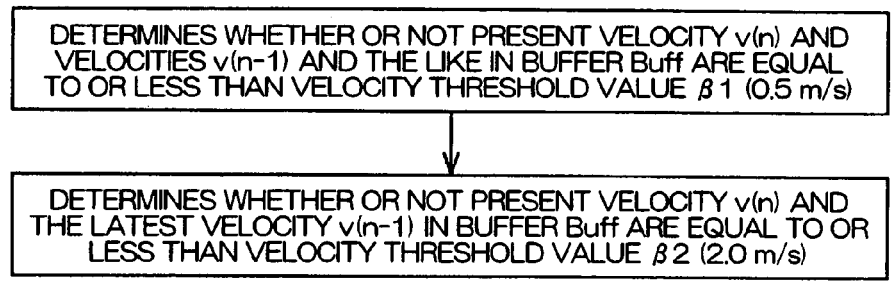
FIG. 24 is a view illustrative of a process based on a velocity evaluation program according to the second embodiment.

FIG. 24 is a view illustrative of the process based on the velocity evaluation program 2118.

As shown in FIG. 24, the control section 2100 determines whether or not the present velocity v(n) and the velocities v(n-1) and the like in the buffer Buff are equal to or less than a velocity threshold value β1 based on the velocity evaluation program 2118. The velocity threshold value β1 is specified in advance. The velocity threshold value β1 is 0.5 meters per second (m/s), for example.

The control section 2100 then determines whether or not the present velocity v(n) and the latest velocity v(n-1) in the buffer Buff are equal to or less than a velocity threshold value β2. The velocity threshold value β2 is specified in advance. The velocity threshold value β2 is 2.0 meters per second (m/s), for example.

As shown in FIG. 20, the terminal 2020 stores a distance evaluation program 2120 in the first storage section 2110.

The distance evaluation program 2120 is a program for causing the control section 2100 to determine whether or not the distance between each of the positions P(n-1) and the like in the buffer Buff and the present position Pg(n) is equal to or less than a distance threshold value γ. The distance threshold value γ is specified in advance. The distance threshold value γ is 15 meters (m), for example.

As shown in FIG. 20, the terminal 2020 stores a cumulative distance evaluation program 2122 in the first storage section 2110. The cumulative distance evaluation program 2122 is a program for causing the control section 2100 to determine whether or not the cumulative distance which is the path length between each of the positions P(n-1) and the like and the present located position Pg(n) is equal to or less than a predetermined cumulative distance threshold value γs.

FIG. 25 is a view illustrative of the process based on the cumulative distance evaluation program 2122.

Figures 25A, 25B:
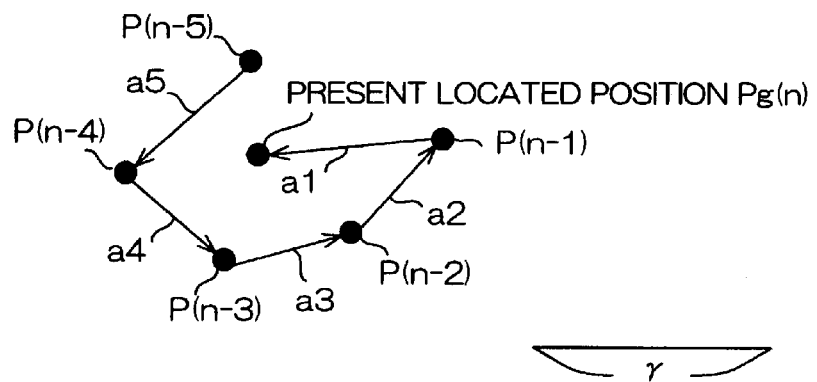
FIGS. 25A and 25B are views illustrative of a process based on a cumulative distance evaluation program according to the second embodiment.

For example, the true position of the terminal 2020 moves from the position P(n-5) to the position P(n-4), moves from the position P(n-4) to the position P(n-3), moves from the position P(n-3) to the position P(n-2), moves from the position P(n-2) to the position P(n-1), and moves from the position P(n-1) to the located position Pg(n), as shown in FIG. 25A.

When the terminal 2020 moves circularly in this manner and the located position Pg(n) indicates the coordinates of the center of the circle, the distance between the located position Pg(n) and each of the positions P(n-5) to P(n-1) may be equal to or less than the distance threshold value γ.

Therefore, whether or not the terminal 2020 moves cannot be accurately determined even if the conditions are merely satisfied that the distance between the located position Pg(n) and each of the positions P(n-5) to P(n-1) is equal to or less than the distance threshold value γ.

As shown in FIG. 25B, the control section 2100 determines whether or not the distance a1 between the position P(n-l) and the located position Pg(n) is equal to or less than the cumulative distance threshold value γs based on the cumulative distance evaluation program 2122. The control section 2100 then determines whether or not the cumulative distance a1+a2 between the position P(n-2) and the located position Pg(n) is equal to or less than the cumulative distance threshold value γs. The control section 2100 then determines whether or not the cumulative distance a1+a2+a3 between the position P(n-3) and the located position Pg(n) is equal to or less than the cumulative distance threshold value γs.

Specifically, the control section 2100 calculates the path length (cumulative distance) between each of the positions P(n-l) and the like and the present located position Pg(n) and determines whether or not the cumulative distance is equal to or less than the cumulative distance threshold value γs. The cumulative distance threshold value γs is specified in advance. The cumulative distance threshold value γs is 20 meters (m), for example.

As shown in FIG. 20, the terminal 2020 stores a movement state determination program 2124 in the first storage section 2110. The movement state determination program 2124 is a program for causing the control section 2100 to determine the movement state of the terminal 2020. The movement state determination program 2124 and the control section 2100 exemplify a movement state determination section.

Figures 26, 27A, 27B:
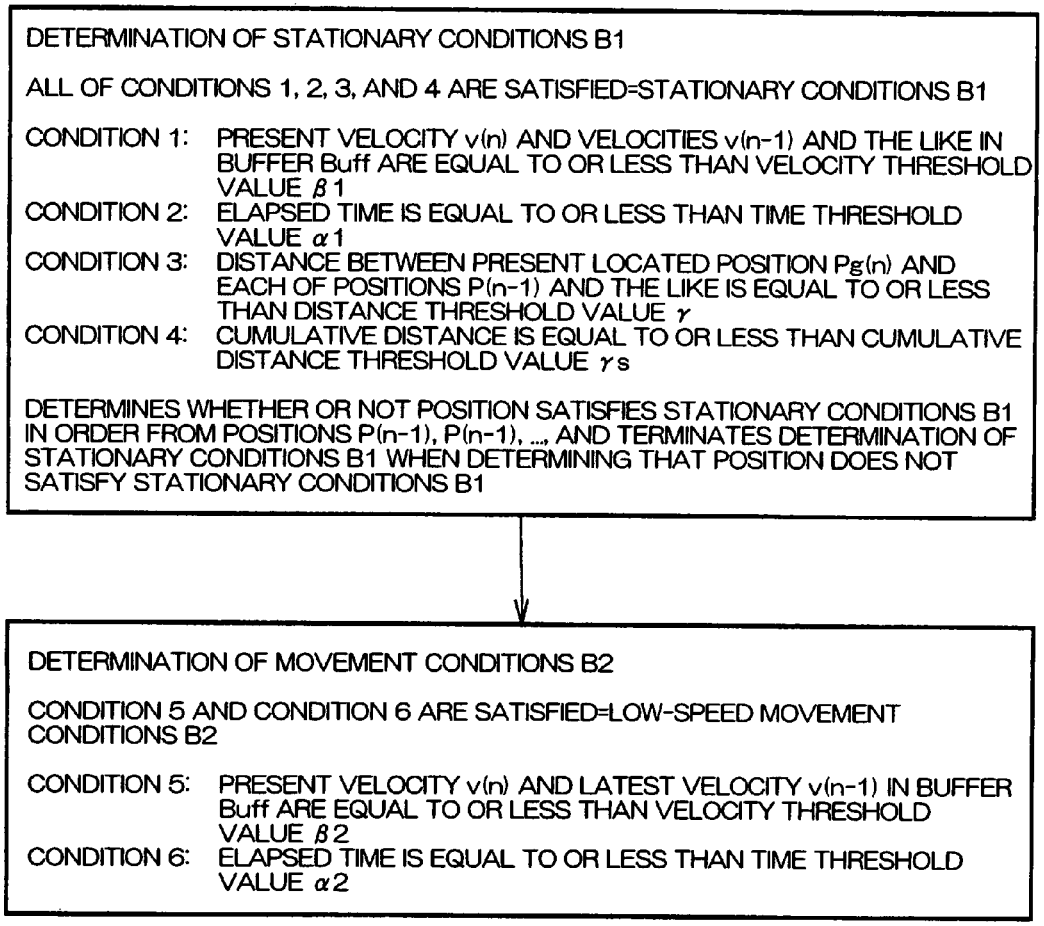
FIG. 26 is a view illustrative of a process based on a movement state determination program according to the second embodiment.
FIGS. 27A and 27B are views showing an example of a process based on an average position calculation program according to the second embodiment.

FIG. 26 is a view illustrative of the process based on the movement state determination program 2124.

As shown in FIG. 26, the control section 2100 determines whether or not the movement state of the terminal 2020 satisfies stationary conditions B1 based on the movement state determination program 2124, and then determines whether or not the movement state of the terminal 2020 satisfies low-speed movement conditions B2.

The stationary conditions B1 are satisfied when all of a condition 1, a condition 2, a condition 3, and a condition 4 are satisfied. The stationary conditions B1 are conditions for the control section 2100 to determine that the terminal 2020 remains stationary. The stationary conditions B1 exemplify stationary conditions.

The condition 1 is a condition whereby the present velocity v(n) and the velocities v(n-1) and the like in the buffer Buff are equal to or less than the velocity threshold value β1. For example, the condition 1 is satisfied when the present velocity v(n) and the velocity v(n-1) are equal to or less than the velocity threshold value β1.

The condition 2 is a condition whereby the elapsed time is equal to or less than the time threshold value α1.

The condition 3 is a condition whereby the distance between the present located position Pg(n) and each of the positions P(n-1) and the like is equal to or less than the distance threshold value γ.

The condition 4 is a condition whereby the cumulative distance is equal to or less than the cumulative distance threshold value γs.

The control section 2100 determines whether or not the positions in the buffer Buff satisfy the stationary conditions B1 based on the movement state determination program 2124 in the order from the latest position.

In more detail, the control section 2100 determines whether or not the present moving velocity v(n) is equal to or less than the velocity threshold value β. When the control section 2100 has determined that the present moving velocity v(n) is not equal to or less than the velocity threshold value β, the control section 2100 terminates the determination of the stationary conditions B1 without determining whether or not each position P(n-1) satisfies the stationary conditions B.

When the control section 2100 has determined that the present moving velocity v(n) is equal to or less than the velocity threshold value β1, the control section 2100 determines whether or not each position P(n-1) satisfies the stationary conditions B1 with respect to the relationship with the present located position Pg(n). The control section 2100 then determines whether or not the present located position Pg(n) and the position P(n-2) satisfy the stationary conditions B1. As described above, the control section 2100 determines whether or not the positions P(n-1) and the like satisfy the stationary conditions B1 in the order from the latest position, and terminates the determination of the stationary conditions B1 when the control section 2100 has determined that the positions P(n-1) and the like do not satisfy the stationary conditions B1.

The low-speed movement conditions B2 are satisfied when a condition 5 and a condition 6 are satisfied.

The low-speed movement conditions B2 are conditions for the control section 2100 to determine that the terminal 2020 moves at a low speed. The low-speed movement conditions B2 exemplify low-speed movement conditions.

The condition 5 is a condition whereby the present velocity v(n) and the latest velocity v(n-1) in the buffer Buff are equal to or less than the velocity threshold value β2.

The condition 6 is a condition whereby the elapsed time between the latest time t(n-1) and the present time t(n) is equal to or less than the time threshold value α2.

The control section 2100 determines whether or not the movement state of the terminal 2020 satisfies the stationary conditions B1, and determines whether or not the movement state of the terminal 2020 satisfies low-speed movement conditions B2 when the movement state of the terminal 2020 does not satisfy the stationary conditions B1.

As shown in FIG. 20, the terminal 2020 stores an average position calculation program 2126 in the first storage section 2110. The average position calculation program 2126 is a program for causing the control section 2100 to average at least one of the positions P(n-1) and the like and the present located position Pg(n) calculated by positioning to calculate the average position Pa or Pb. The average positions Pa and Pb exemplify average positions. The average position calculation program 2126 and the control section 2100 exemplify an average position calculation section.

The average position calculation program 2126 includes a first average position calculation program 2126a and a first average position calculation program 2126b.

FIG. 27 is a view showing an example of the process based on the average position calculation program 2126.

As shown in FIG. 27A, the control section 2100 averages all of the positions P satisfying the stationary conditions B1 and the located positions Pg(n) based on the first average position calculation program 2126a.

For example, when the positions P satisfying the stationary conditions B are the positions P(n-1), P(n-2), P(n-3), P(n-4), and P(n-5), the control section 2100 calculates the average position of the positions P(n-1) to P(n-5) and the located position Pg(n).

The control section 2100 calculates the average position of all of the positions P satisfying the stationary conditions B1 and the located position Pg(n). For example, when all of the positions P in the buffer Buff satisfy the stationary conditions B2, the control section 2100 averages eleven positions including the located position Pg(n).

The control section 2100 stores first average position information 2160 indicating the average position Pa in the second storage section 2150.

As shown in FIG. 27B, when the low-speed movement conditions B2 are satisfied, the control section 2100 averages the latest position P(n-1) and the located position Pg(n) to calculate the average position Pb based on the second average position calculation program 2126b.

The control section 2100 stores second average position information 2162 indicating the average position Pb in the second storage section 2150.

Since the control section 2100 determines whether or not the low-speed movement condition B2 are satisfied only when the stationary conditions B1 are not satisfied, the control section 2100 averages the positions based on the second average position calculation program 2126b only when the control section 2100 does not calculate the average position Pa based on the first average position calculation program 2126a.

As shown in FIG. 20, the terminal 2020 stores a position output program 2128 in the first storage section 2110. The position output program 2128 is a program for causing the control section 2100 to output the average position Pa or Pb or the located position Pg(n). The position output program 2128 and the control section 2100 exemplify a position output section.

In more detail, the control section 2100 displays the average position Pa on the display device 36 (see FIG. 19) when the position P satisfying the stationary conditions B1 exists.

The control section 2100 displays the average position Pb on the display device 2036 (see FIG. 19) when the position P satisfying the stationary conditions B1 does not exist and the movement state of the terminal 2020 satisfies the low-speed movement conditions B2.

The control section 2100 displays the located position Pg(n) on the display device 36 when the position P satisfying the stationary conditions B1 does not exist and the movement state of the terminal 2020 does not satisfy the low-speed movement conditions B2.

As shown in FIG. 20, the terminal 2020 stores a position storage program 2130 in the first storage section 2110. The position storage program 2130 is a program for causing the control section 2100 to store the average position Pa or Pb or the located position Pg(n) in the buffer Buff. The position storage program 2130 and the control section 2100 exemplify a position storage section.

Figure 28:
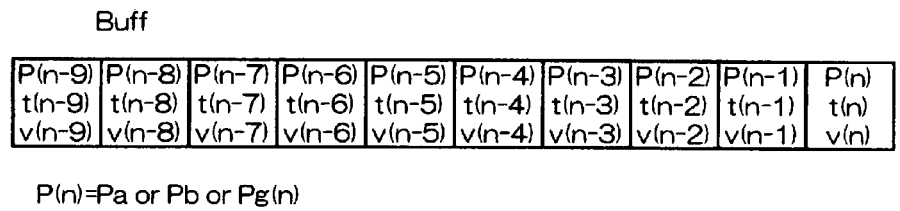
FIG. 28 is a view showing an example of the buffer Buff of a process based on a position storage program according to the second embodiment.

FIG. 28 is a view showing an example of the buffer Buff in the process based on the position storage program 2130.

As shown in FIG. 28, the control section 2100 stores the average position Pa or Pb or the located position Pg(n) last output during single-shot positioning or multi-shot positioning in the buffer Buff as the new position P(n-1).

When the control section 2100 has displayed the average position Pa on the display device 2036, the control section 2100 stores the average position Pa in the buffer Buff as the new position P(n-1).

When the control section 2100 has displayed the average position Pb on the display device 36, the control section 2100 stores the average position Pb in the buffer Buff as the new position P(n-1).

When the control section 2100 has displayed the position Pg(n) on the display device 2036, the control section 2100 stores the position Pg(n) in the buffer Buff as the new position P(n-1).

The terminal 2020 is configured as described above.

The terminal 2020 can calculate the average position Pa or Pb based on the movement state of the terminal 2020. Specifically, the terminal 2020 does not average (correct) the expected position estimated from the last located position, the last velocity vector, and the elapsed time and the present located position. The terminal 2020 averages the positions in the buffer Buff and the present located position Pg(n) calculated by positioning to calculate the average position Pa or Pb based on the movement state of the terminal 2020. Therefore, the accuracy of the preceding velocity vector does not affect the correction of the present located position Pg(n).

When the terminal 2020 remains stationary, the located position Pg(n) is continuously indicated by the coordinates near the specific position. When the terminal 2020 moves at a low speed, the located position Pg(n) is indicated by the coordinates which gradually move away from the specific position.

Since the variation in the located positions Pg(n) is reduced by averaging, the position P is indicated by the coordinates near the true position when the terminal 2020 remains stationary or moves at a low speed. On the other hand, the true position does not necessarily exist near the expected position.

Therefore, the output position becomes very close to the true position by averaging the positions P and the present located position Pg(n) and outputting the average position Pa or Pb in comparison with the case of outputting a position obtained by averaging the expected position and the present located position Pg(n).

This allows a reliable and accurate position to be output.

Since the stationary state of the terminal 2020 is determined based on the stationary conditions B1 using a plurality of criteria (i.e. moving velocity, elapsed time, and distance), whether or not the terminal 2020 is in a stationary state can be accurately determined.

Since the stationary conditions B1 include the condition whereby the cumulative distance is equal to or less than the cumulative distance threshold value γs, the terminal 2020 can determine the stationary state based on the cumulative distance, even when the terminal 2020 moves circularly within a short range and the stationary state of terminal 2020 cannot be determined based on the distance.

Since the low-speed movement state of the terminal 2020 is determined based on the low-speed movement conditions B2 using a plurality of criteria (i.e. moving velocity and elapsed time), whether or not the terminal 2020 is in a low-speed movement state can be accurately determined.

The configuration of the terminal 2020 according to this embodiment has been described above. An operation example of the terminal 2020 is described below mainly using FIGS. 29 and 30.

Figure 29:
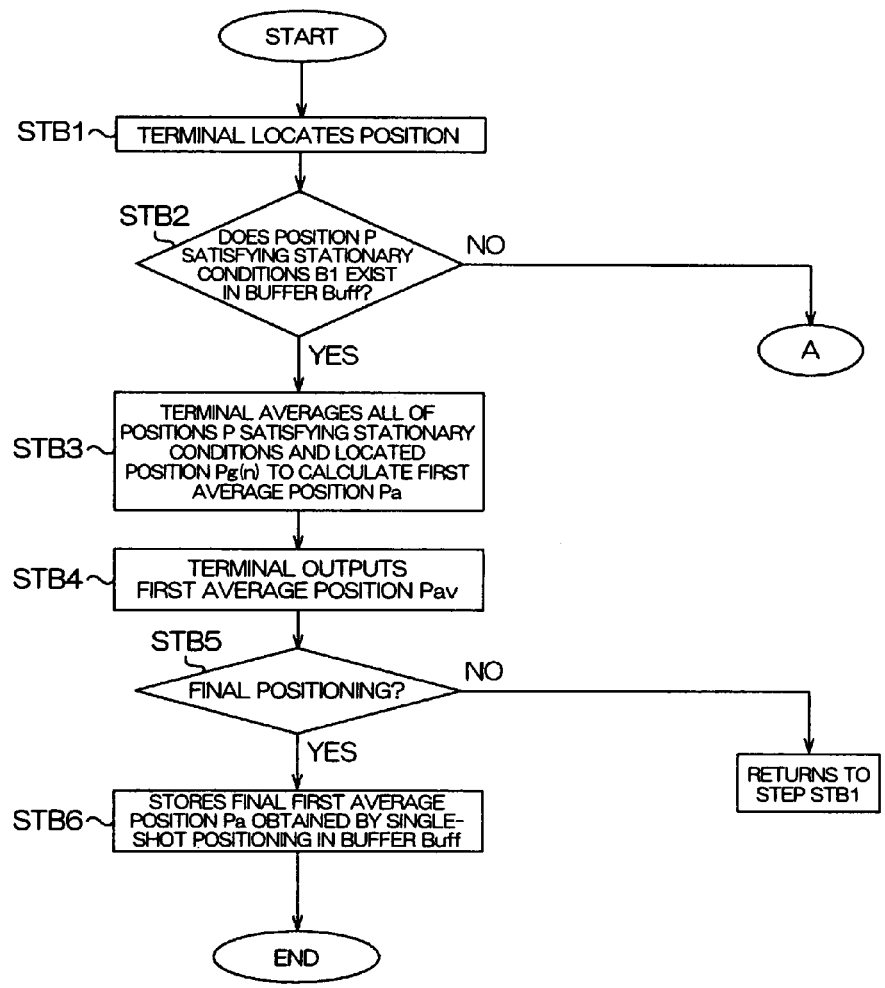
FIG. 29 is a schematic flowchart showing an operation example of the terminal according to the second embodiment.
Figure 30:
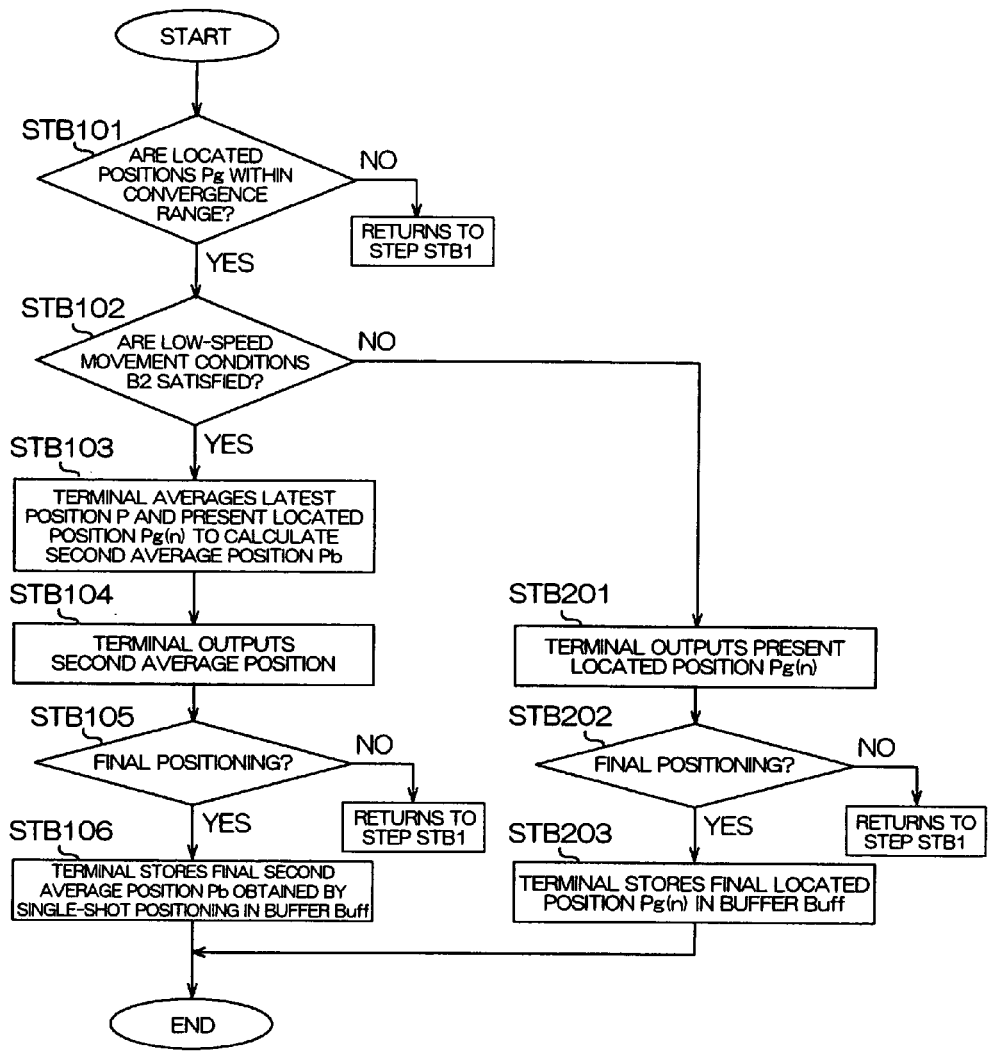
FIG. 30 is a schematic flowchart showing an operation example of the terminal according to the second embodiment.

FIGS. 29 and 30 are schematic flowcharts showing an operation example of the terminal 2020 according to this embodiment.

The following description is given on the assumption that the terminal 2020 performs multi-shot positioning (see FIG. 22B) in FIGS. 29 and 30. The following description is given on the assumption that multi-shot positioning is configured so that positioning is terminated when the positioning operation has been performed ten times (predetermined number) after the stable position Pst has been calculated (or, when the variation in the located position Pg has fallen within a predetermined convergence range).

The terminal 2020 locates the position (step STB1 in FIG. 29).

The terminal 2020 determines whether or not each of the positions P(n-1) and the like in the buffer Buff satisfies the stationary conditions B1 (step STB2). The step STB2 exemplifies a movement state determination step.

When the terminal 2020 has determined that the position P satisfying the stationary conditions B1 exists in the step STB3, the terminal 2020 averages all of the positions P(n-1) and the like satisfying the stationary conditions B1 and the located position Pg(n) to calculate the first average position Pa (step STB3). The step STB3 exemplifies an average position calculation section.

The terminal 2020 outputs the first average position Pa (step STB5). The step STB5 exemplifies a position output step.

In the step STB3, the first average position Pa may be calculated only when five or more positions P are held in the buffer Buff, differing from this embodiment. The located position Pg(n) may be output in the step STB4 when five or more positions P are not held in the buffer Buff.

The terminal 2020 determines whether or not the positioning operation is the final positioning operation in single-shot positioning (step STB5). In more detail, the terminal 2020 determines whether or not the positioning operation has been performed ten times (predetermined number) after the stable position Pst has been calculated (or, when the variation in the located position Pg has fallen within a predetermined convergence range).

When the terminal 2020 has determined that the positioning operation is the final positioning operation in the step STB5, the terminal 2020 stores the average position Pa in the buffer Buff as the position P(n-1) (step STB6). The step STB6 exemplifies a position storage step.

When the terminal 2020 has determined that the positions P(n-1) and the like do not satisfy the stationary conditions B1 in the step STB2, the terminal 2020 determines whether or not the located positions Pg(n) are within the convergence range (step STB101 in FIG. 30). A state in which the located positions Pg(n) are within the convergence range refers to a state in which the variation in the located positions Pg(n) is within a predetermined range (e.g. 100 meters (m)).

When the terminal 2020 has determined that the located positions Pg(n) are not within the convergence range, the terminal 2020 returns to the step STB1 and continues calculation of the located position Pg(n).

When the terminal 2020 has determined that the located positions Pg(n) are within the convergence range in the step STB101, the terminal 2020 determines whether or not the movement state of the terminal 2020 satisfies the low-speed movement conditions B2 (step STB102).

When the terminal 2020 has determined that the movement state of the terminal 2020 satisfies the low-speed movement conditions B2 in the step STB102, the terminal 2020 averages the latest position P and the located position Pg(n) to calculate the second average position Pb (step STB103). The step STB103 also exemplifies the average position calculation step.

The terminal 2020 outputs the second average position (step STB104). The step STB104 also exemplifies the position output step.

The terminal 2020 determines whether or not the positioning operation is the final positioning operation in single-shot positioning (step STB105), and stores the second average position Pb in the buffer Buff when the positioning operation is the final positioning operation (step STB106). The step STB106 also exemplifies the position storage step.

When the terminal 2020 has determined that the positioning operation is not the final positioning operation in single-shot positioning in the step STB105, the terminal 2020 returns to the step STB1.

When the terminal 2020 has determined that the movement state of the terminal 2020 does not satisfy the low-speed movement conditions B2 in the step STB101, the terminal 2020 outputs the present located position Pg(n) (step STB201).

The terminal 2020 determines whether or not the positioning operation is the final positioning operation in single-shot positioning (step STB202), and stores the located position Pg(n) in the buffer Buff when the positioning operation is the final positioning operation (step STB203).

When the terminal 2020 has determined that the positioning operation is not the final positioning operation in single-shot positioning in the step STB202, the terminal 2020 returns to the step STB1.

Since average position Pa is calculated by the above steps in a stationary state, a reliable and accurate position can be output.

Since the average position Pb is calculated when the terminal 2020 moves at a low speed, a position corresponding to the movement state can be output in a low-speed movement state.

Since the located position Pg(n) is output when the terminal 2020 is not in a stationary state or a low-speed movement state, a position can be output which promptly follows the true position during movement.

As described with reference to the step STB102, the terminal 2020 calculates the second average position Pb when the variation in the located positions Pg(n) has fallen within the predetermined range. Therefore, the average position Pb can be calculated after the located position Pg has become stable to ensure reliability.

On the other hand, the terminal 2020 calculates the first average position Pa without waiting for the variation in the located positions Pg(n) to fall within the predetermined range. Specifically, since the first average position Pa is averaged with one or more positions P, the first average position Pa is obtained as a reliable position close to the true position without waiting for the variation in the located positions Pg(n) to fall within the predetermined range.

(Program, Computer-Readable Recording Medium, and the Like)

A program for controlling a positioning device may be provided which causes a computer to execute the movement state determination step, the average position calculation step, the position output step, the position storage step, and the like of the above-described operation example.

A computer-readable recording medium having such a program for controlling a positioning device recorded thereon and the like may also be provided.

A program storage medium used to install the program for controlling a positioning device and the like in a computer to allow the program and the like to be executable by the computer may be implemented by a packaging medium such as a flexible disk such as a floppy disk (registered trademark), a compact disc read only memory (CD-ROM), a compact disc-recordable (CD-R), a compact disc-rewritable (CD-RW), or a digital versatile disc (DVD), a semiconductor memory, a magnetic disk, or a magnetooptical disk in which the program is stored temporary or permanently, or the like.

The invention is not limited to the above embodiments. The above embodiments may be configured in combination.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A positioning device that locates a position based on satellite signals from positioning satellites, the positioning device comprising:
   a position holding section which holds a plurality of reference positions;
   a stationary condition determination section that determines the reference positions that satisfy stationary conditions, the stationary conditions including a first condition where elapsed times between times when calculating each of a specific number of the reference positions and a present time are within an allowable time range, a second condition where moving velocities of the positioning device when calculating each of a specific number of the reference positions and a present moving velocity of the positioning device are within a predetermined allowable velocity range, and a third condition where distances between each of a specific number of the reference positions and the present located position are within an allowable distance range;
   an average position calculation section that averages the reference positions satisfying the stationary conditions and a present located position to calculate an average position;
   a position output section that outputs the average position; and
   a position storage section that stores the average position in the position holding section as a reference position.

2. The positioning device as defined in claim 1, wherein the stationary conditions include a fourth condition where a cumulative distance is equal to or less than a predetermined cumulative distance threshold value, the cumulative distance being a path length between a specific number of the reference positions and the present located position.

3. The positioning device as defined in claim 1, wherein the stationary conditions are specified corresponding to reception environment of the satellite signals.

4. The positioning device as defined in claim 1, wherein the position storage section stores the located position in the position holding section instead of the reference position until a predetermined number is reached, and stores the reference position after the predetermined number has been reached.

5. The positioning device as defined in claim 1, wherein the position storage section stores the average position initially calculated within a positioning time involving a plurality of positioning operations in the position holding section, and updates the initially calculated average position held in the position holding section with the average position last calculated within the positioning time.

6. The positioning device as defined in claim 1, further comprising
a stationary condition change section that makes the stationary conditions more severe after the initial average position has been calculated.

7. The positioning device as defined in claim 1, wherein
the average position calculation section including a determination section that determined whether or not a state in which the reference position does not satisfy the stationary conditions continuously occurs, the average position calculation section averages the positions using the reference position satisfying the stationary conditions when the determination section had determined that a state in which the reference position does not satisfy the stationary conditions does not continuously occur.

8. A method of controlling a positioning device that locates a position based on satellite signals from positioning satellites and includes a position holding section that holds a plurality of reference positions the method comprising:
a stationary condition determination step of determining the reference positions that satisfy stationary conditions, the stationary conditions including a first condition where elapsed times between times when calculating each of a specific number of the reference positions and a present time are within an allowable time range, a second condition where moving velocities of the positioning device when calculating each of a specific number of the reference positions and a present moving velocity of the positioning device are within a predetermined allowable velocity range, and a third condition where distances between each of a specific number of the reference positions and the present located position are within an allowable distance range;
an average position calculation step of averaging the reference positions satisfying the stationary conditions and a present located position to calculate an average position;
a position output step of outputting the average position; and
a position storage step of storing the average position in the position holding section as a reference position.

9. A computer-readable recording medium having recorded thereon a program that causes a computer included in a positioning device that locates a position based on satellite signals from positioning satellites and includes a position holding section that holds a plurality of reference positions, the method comprising:
a stationary condition determination step of determining whether or not the reference positions that satisfy stationary conditions, the stationary conditions including a first condition where elapsed times between times when calculating each of a specific number of the reference positions and a present time are within an allowable time range, a second condition where moving velocities of the positioning device when calculating each of a specific number of the reference positions and a present moving velocity of the positioning device are within a predetermined allowable velocity range, and a third condition where distances between each of a specific number of the reference positions and the present located position are within an allowable distance range;
an average position calculation step of averaging the reference positions satisfying the stationary conditions and a present located position to calculate an average position;
a position output step of outputting the average position; and
a position storage step of storing the average position in the position holding section as a reference position.

* * * * *